(12) United States Patent
Vinciarelli

(10) Patent No.: US 11,831,246 B1
(45) Date of Patent: *Nov. 28, 2023

(54) ADAPTIVE CONTROL OF RESONANT POWER CONVERTERS

(71) Applicant: Vicor Corporation, Andover, MA (US)

(72) Inventor: Patrizio Vinciarelli, Boston, MA (US)

(73) Assignee: Vicor Corporation, Andover, MA (US)

( * ) Notice: Subject to any disclaimer, the term of this patent is extended or adjusted under 35 U.S.C. 154(b) by 201 days.

This patent is subject to a terminal disclaimer.

(21) Appl. No.: 17/236,162

(22) Filed: Apr. 21, 2021

Related U.S. Application Data

(62) Division of application No. 16/849,531, filed on Apr. 15, 2020, now Pat. No. 11,018,594, which is a division of application No. 16/177,561, filed on Nov. 1, 2018, now Pat. No. 10,637,364, which is a division of application No. 16/003,185, filed on Jun. 8, 2018, (Continued)

(51) Int. Cl.
*H02M 3/335* (2006.01)
*H02M 1/08* (2006.01)
*H02M 3/337* (2006.01)
*H02M 1/00* (2006.01)

(52) U.S. Cl.
CPC ....... *H02M 3/33592* (2013.01); *H02M 1/083* (2013.01); *H02M 3/3376* (2013.01); *H02M 1/0054* (2021.05); *H02M 1/0058* (2021.05); *Y02B 70/10* (2013.01)

(58) Field of Classification Search
CPC ... H02M 1/083; H02M 1/0054; H02M 1/0058
See application file for complete search history.

(56) References Cited

U.S. PATENT DOCUMENTS

| 5,010,261 A | 4/1991 | Steigerwald | |
| 5,514,921 A * | 5/1996 | Steigerwald | ............ H02M 1/08 |
| | | | 327/108 |

(Continued)

OTHER PUBLICATIONS

U.S. Appl. No. 13/933,252, filed Jul. 29, 2013, Vinciarelli et al.

(Continued)

*Primary Examiner* — Yusef A Ahmed
(74) *Attorney, Agent, or Firm* — Fish & Richardson P.C.

(57) ABSTRACT

A power converter including a transformer, a resonant circuit including the transformer and a resonant capacitor having a characteristic resonant frequency and period, and output circuitry connected to the transformer for delivering a rectified output voltage to a load. Primary switches drive the resonant circuit, a switch controller operates the primary switches in a series of converter operating cycles which include power transfer intervals of adjustable duration during which a resonant current at the characteristic resonant frequency flows through a winding of the transformer. The operating cycles may also include energy recycling intervals of variable duration for charging and discharging capacitances within the converter. A gate driver includes a transformer, a plurality of switches, a current monitor, and a controller that operates the switches in a series of driver operating cycles having adjustable ON periods and adjustable transition periods during which capacitances are resonantly charged and discharged.

39 Claims, 13 Drawing Sheets

Related U.S. Application Data now Pat. No. 10,153,704, which is a division of application No. 15/715,818, filed on Sep. 26, 2017, now Pat. No. 10,020,752.

(56) References Cited

U.S. PATENT DOCUMENTS

| | | | | |
|---|---|---|---|---|
| 5,594,635 | A * | 1/1997 | Gegner | H02M 3/33571 363/124 |
| 5,625,539 | A * | 4/1997 | Nakata | H02M 7/4807 363/17 |
| 5,793,623 | A * | 8/1998 | Kawashima | H02P 27/08 363/56.05 |
| 5,875,103 | A * | 2/1999 | Bhagwat | H02M 3/3376 363/71 |
| 5,946,200 | A * | 8/1999 | Kim | H02M 3/33571 363/17 |
| 6,111,767 | A * | 8/2000 | Handleman | H02M 7/53871 363/95 |
| 6,147,881 | A * | 11/2000 | Lau | H02M 3/33573 363/134 |
| 6,154,381 | A * | 11/2000 | Kajouke | H02M 3/1584 363/65 |
| 6,169,673 | B1 * | 1/2001 | McIntyre | H02M 3/07 363/59 |
| 6,930,893 | B2 * | 8/2005 | Vinciarelli | H02M 3/28 363/17 |
| 6,984,965 | B2 * | 1/2006 | Vinciarelli | H02M 7/003 323/266 |
| 7,091,753 | B2 * | 8/2006 | Inoshita | H02M 1/08 327/108 |
| 7,145,786 | B2 * | 12/2006 | Vinciarelli | H02M 3/33573 363/17 |
| 7,154,786 | B2 | 12/2006 | Ikai et al. | |
| 7,561,446 | B1 | 7/2009 | Vinciarelli | |
| 8,222,772 | B1 * | 7/2012 | Vinciarelli | H02M 1/4258 307/140 |
| 8,669,744 | B1 | 3/2014 | Vinciarelli | |
| 8,860,384 | B2 * | 10/2014 | Chen | H02M 3/1582 323/283 |
| 9,083,254 | B1 | 7/2015 | Clarkin | |
| 9,112,422 | B1 * | 8/2015 | Vinciarelli | H02M 3/33507 |
| 9,166,481 | B1 * | 10/2015 | Vinciarelli | H02M 3/33571 |
| 9,325,247 | B1 * | 4/2016 | Vinciarelli | H02M 3/33507 |
| 9,411,350 | B1 * | 8/2016 | Yem | G05F 1/575 |
| 9,502,987 | B1 * | 11/2016 | Feno | H02M 3/33546 |
| 9,571,084 | B1 * | 2/2017 | Vinciarelli | H03K 17/063 |
| 9,660,537 | B1 * | 5/2017 | Vinciarelli | H02M 1/38 |
| 9,667,153 | B2 * | 5/2017 | Hara | H02M 3/33507 |
| 10,014,798 | B1 * | 7/2018 | Vinciarelli | G06F 1/3287 |
| 10,020,752 | B1 | 7/2018 | Vinciarelli | |
| 10,033,272 | B2 * | 7/2018 | Rader | H02M 3/156 |
| 10,050,519 | B2 * | 8/2018 | Vinciarelli | H02M 1/08 |
| 10,158,357 | B1 * | 12/2018 | Vinciarelli | H03K 5/08 |
| 10,205,381 | B1 * | 2/2019 | Vinciarelli | H02M 3/158 |
| 10,637,364 | B1 | 4/2020 | Vinciarelli | |
| 2003/0142513 | A1 * | 7/2003 | Vinciarelli | H02J 1/102 363/17 |
| 2003/0227280 | A1 * | 12/2003 | Vinciarelli | H02M 3/285 323/265 |
| 2004/0027101 | A1 * | 2/2004 | Vinciarelli | H02M 3/1582 323/259 |
| 2004/0174147 | A1 * | 9/2004 | Vinciarelli | H02M 1/088 323/266 |
| 2004/0184289 | A1 * | 9/2004 | Vinciarelli | H02J 1/102 363/15 |
| 2005/0078491 | A1 * | 4/2005 | Song | H02M 3/33569 363/17 |
| 2005/0121067 | A1 * | 6/2005 | Toyomura | H01L 31/02021 136/244 |
| 2005/0185430 | A1 * | 8/2005 | Vinciarelli | H02M 3/157 363/65 |
| 2005/0254272 | A1 * | 11/2005 | Vinciarelli | H02M 3/157 363/65 |
| 2005/0270812 | A1 * | 12/2005 | Vinciarelli | H02M 3/33573 363/65 |
| 2006/0022650 | A1 * | 2/2006 | Vinciarelli | H02M 3/33523 323/266 |
| 2006/0192437 | A1 | 8/2006 | Tolle | |
| 2007/0069581 | A1 * | 3/2007 | Mino | H02M 1/42 307/12 |
| 2008/0123374 | A1 * | 5/2008 | Vinciarelli | H02M 7/10 363/65 |
| 2009/0306914 | A1 * | 12/2009 | Cohen | G05F 1/70 702/60 |
| 2010/0315840 | A1 * | 12/2010 | Cohen | H02M 3/33507 363/21.04 |
| 2012/0044722 | A1 * | 2/2012 | Cuk | H02M 3/335 363/21.03 |
| 2012/0139435 | A1 * | 6/2012 | Storm | H02M 3/158 363/53 |
| 2012/0281436 | A1 * | 11/2012 | Cuk | H02M 3/33569 363/21.03 |
| 2013/0141059 | A1 * | 6/2013 | Parkhurst | H02M 3/156 323/271 |
| 2013/0314951 | A1 * | 11/2013 | Harrison | H02M 3/33592 363/21.02 |
| 2013/0335043 | A1 * | 12/2013 | He | H02M 3/08 323/234 |
| 2013/0336031 | A1 * | 12/2013 | McCune, Jr. | H02M 7/2176 363/80 |
| 2014/0084890 | A1 * | 3/2014 | Philip | H02M 1/14 323/284 |
| 2014/0217996 | A1 * | 8/2014 | Peker | H02M 3/1582 323/271 |
| 2014/0257632 | A1 * | 9/2014 | Kanzaki | B60R 16/033 701/36 |
| 2014/0293658 | A1 * | 10/2014 | Cao | H02M 3/33576 363/21.02 |
| 2014/0369076 | A1 * | 12/2014 | Cho | H02M 3/3376 363/17 |
| 2015/0023068 | A1 * | 1/2015 | Uno | H02M 3/33515 363/21.13 |
| 2015/0171737 | A1 * | 6/2015 | Pagano | H02M 1/32 323/284 |
| 2015/0222193 | A1 * | 8/2015 | Zambetti | H02M 1/08 363/21.02 |
| 2015/0229215 | A1 * | 8/2015 | Choudhary | H02M 3/1582 323/271 |
| 2015/0256087 | A1 * | 9/2015 | Jitaru | H01F 3/14 363/21.06 |
| 2016/0020692 | A1 * | 1/2016 | Castelli | H02M 1/4208 323/205 |
| 2016/0344297 | A1 | 11/2016 | Lee | |
| 2017/0085187 | A1 * | 3/2017 | Ishigaki | H02M 3/33584 |
| 2017/0207703 | A1 * | 7/2017 | Houston | H02M 3/1582 |
| 2017/0207704 | A1 * | 7/2017 | Houston | H02M 3/1582 |
| 2017/0271873 | A1 * | 9/2017 | Huang | H02J 7/34 |
| 2018/0159426 | A1 * | 6/2018 | Vinciarelli | H02M 3/1582 |
| 2018/0287490 | A1 * | 10/2018 | Yuasa | H02P 27/06 |
| 2019/0044434 | A1 * | 2/2019 | Elferich | H02M 3/01 |
| 2019/0089170 | A1 * | 3/2019 | Liu | H02J 7/00712 |

OTHER PUBLICATIONS

Yao et al., "A Novel Resonant Gate Driver for High Frequency Synchronous Buck Converters," IEEE Transactions on Power Electronics, Mar. 2002, 17(2):180-186, 7 pages.

* cited by examiner

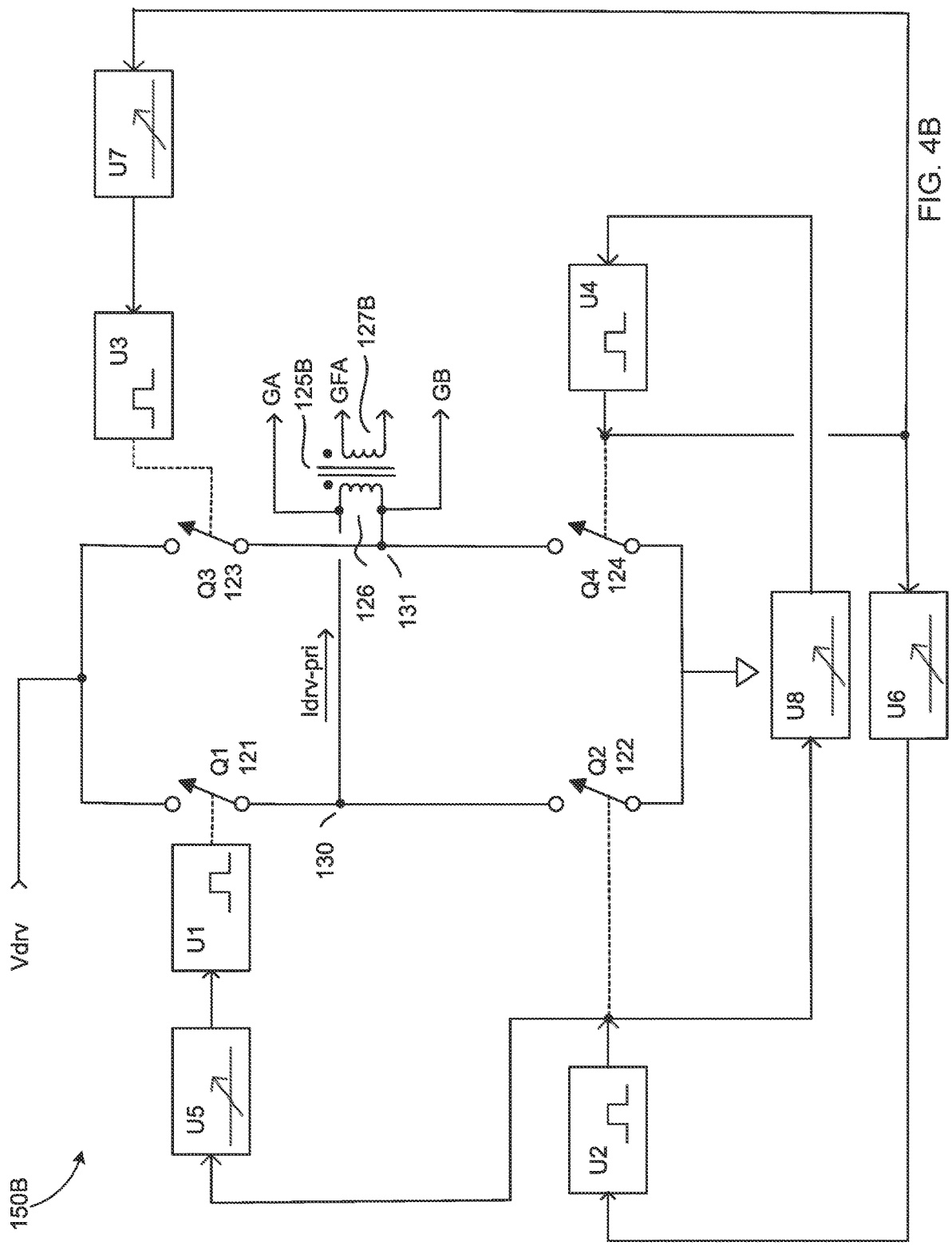

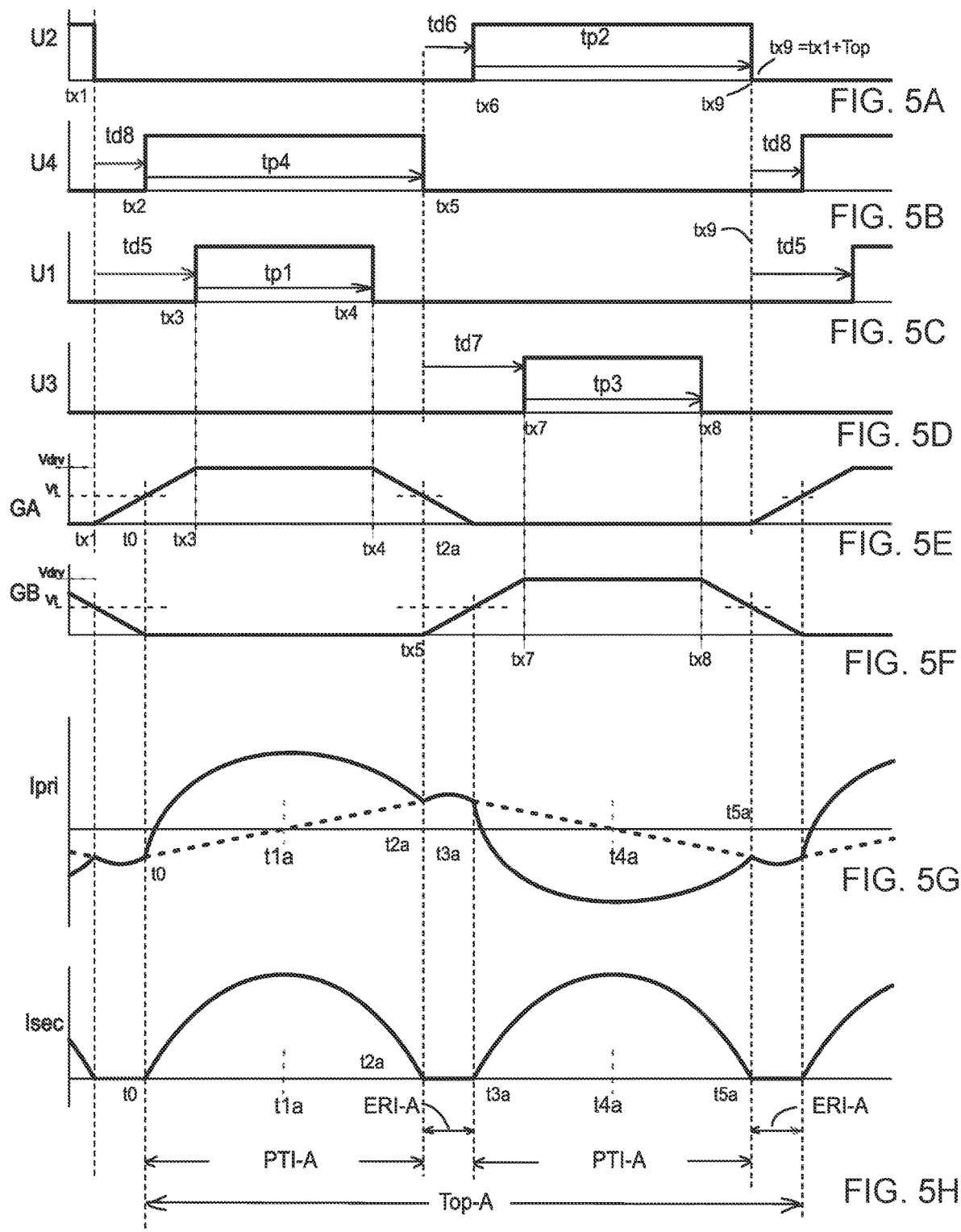

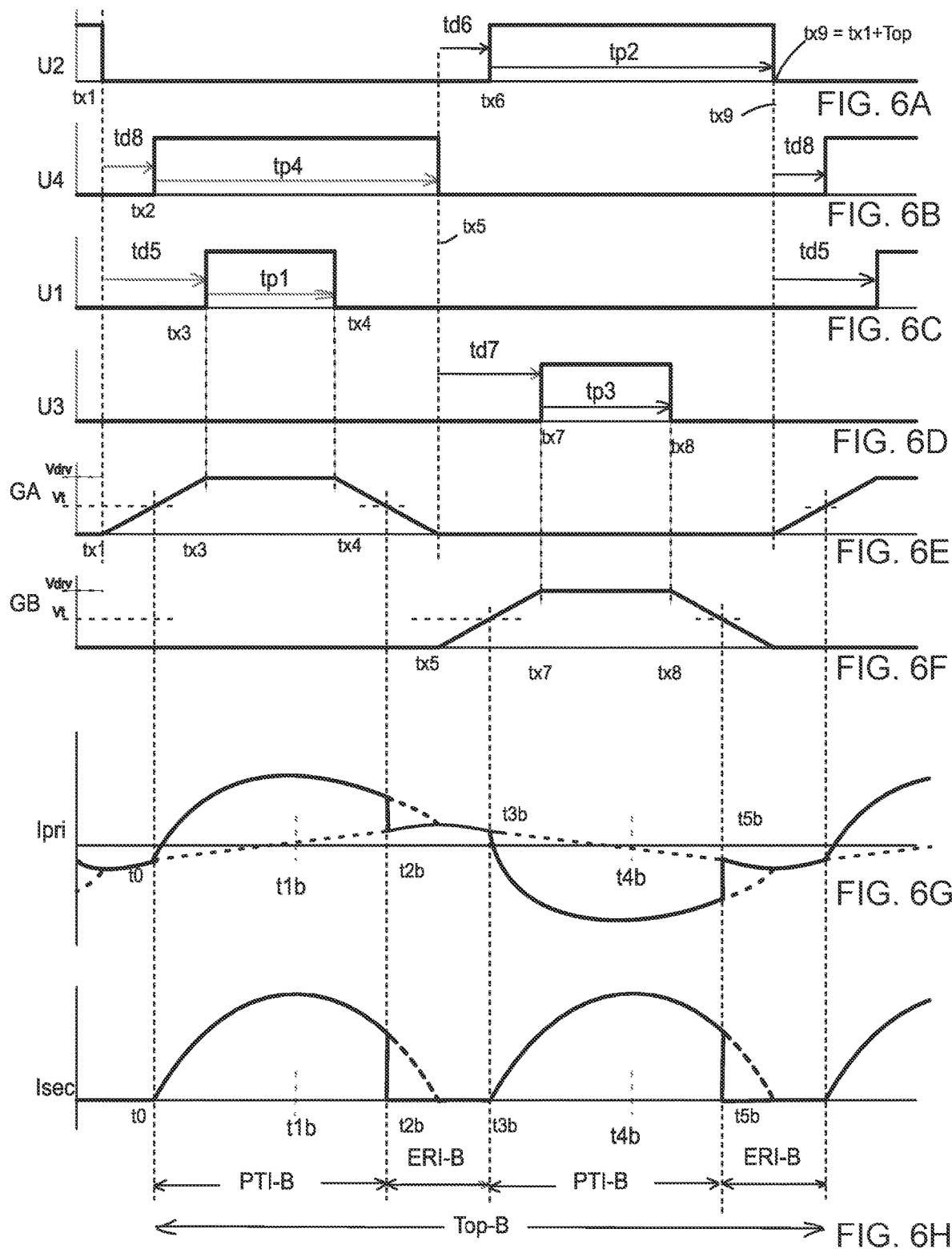

ADAPTIVE CONTROL OF RESONANT POWER CONVERTERS

CROSS-REFERENCE TO RELATED APPLICATIONS

This application is a divisional of and claims priority to U.S. patent application Ser. No. 16/849,531, filed on Apr. 15, 2020, which is a divisional of and claims priority to U.S. application Ser. No. 16/177,561, filed on Nov. 1, 2018, which is a divisional of and claims priority to U.S. patent application Ser. No. 16/003,185, filed on Jun. 8, 2018, now U.S. Pat. No. 10,153,704, which is a divisional of and claims priority to U.S. patent application Ser. No. 15/715,818, filed on Sep. 26, 2017, now U.S. Pat. No. 10,020,752. The above patents and patent applications are incorporated herein by reference in their entirety.

TECHNICAL FIELD

This invention relates to the field of electrical power conversion and more particularly to resonant switching power converters,

BACKGROUND

Resonant switching power converters may be used as fixed ratio bus converters in power conversion systems to provide scaling of voltages and currents and optionally galvanic isolation. In non-idealized switching converters, i.e., switches used in the converter have parasitic capacitances and inductances, power may be dissipated in a switch when the switch is being turned ON, giving rise to a "switching loss." Capacitances, both parasitic and lumped, across a switch if not discharged before the switch is turned ON may be a major contributor to switching loss. One way to reduce switching loss in a switching power converter is to use an inductive current to fully or partially charge and discharge the capacitances associated with a switch before turning it ON to achieve full or partial zero voltage switching ("ZVS") during an energy recycling interval ("ERI") (which may also be called a "ZVS" interval). ZVS ideally causes the voltage across the switch to decline to zero volts, essentially eliminating switching loss associated with the capacitive discharge of the switch; however, any significant reduction, e.g. by 50 percent, 80 percent, 90 percent, or more from the peak voltage across the switch, respectively reduces the switching loss during turn ON by approximately 75 percent, 96 percent, 99 percent, or more. Turning switches ON and OFF at times when zero or minimal current is flowing through the switch, called zero current switching ("ZCS"), can also reduce losses and reduce noise.

SUMMARY

One exemplary method of converting power from a source at a source voltage, $V_S$, via a converter input at an input voltage, $V_{IN}$, for delivery to a load via a converter output at a rectified output voltage, $V_{OUT}$, where a current drawn by the load, $I_L$, may vary over a normal operating range from a minimum load current, $I_{L-MIN}$, to a maximum load current, $I_{L-MAX}$, may include providing a transformer. A resonant circuit including the transformer may be formed having a characteristic resonant frequency and period. Output circuitry may be connected to the transformer for delivering the rectified output voltage to the load. Input circuit circuitry including two or more primary switches may be connected to drive the resonant circuit. A switch controller may be provided to operate the primary switches in a series of converter operating cycles to provide an essentially fixed voltage transformation ratio, $K=V_{OUT}/V_{IN}$, at a load current, each converter operating cycle characterized by (a) two power transfer intervals of essentially equal duration each interval having a duration, $T_{PTI}$, less than the characteristic resonant period, during which one or more of the primary switches are ON, a resonant current at the characteristic resonant frequency and a magnetizing current flow through a winding of the transformer, and power is transferred from the input to the output via the transformer; and (b) two energy-recycling intervals, each having a duration during which the primary switches are OFF and currents in the converter are used to charge and discharge capacitances in the converter. A predetermined full duration, $T_{PTI-FULL}$, approximately equal one half of the characteristic resonant period may be established for each power transfer interval for conditions in which the load current, $I_L$, is greater than or equal to a first predetermined threshold, $I_{L1}$. A predetermined minimum duration, $T_{PTI-MIN}$, may be established for each power transfer interval for conditions in which the load current, $I_L$, is less than or equal to a second predetermined threshold, $I_{L2}$. The duration of each power transfer interval, $T_{PTI}$, may be adjusted from the predetermined full duration, $T_{PTI-FULL}$, to the predetermined minimum, $T_{PTI-MIN}$, as a function of variations in the load current, $I_L$, between the first threshold, $I_{L1}$, and the second threshold, $I_{L2}$.

Another exemplary method of controlling power train switches in a power converter may include providing a gate drive circuit including a gate drive source having a positive terminal and a negative terminal, an inductor having a first end and a second end, a plurality of gate drive switches, including a first, a second, a third, and a fourth gate drive switch, connected to drive the inductor, and a switch controller connected to operate the gate drive switches in a series of driver operating cycles. The driver operating cycles may include a first interval during which the first and fourth gate drive switches are ON and connect the first end of the inductor to the positive terminal and a second end of the inductor to the negative terminal during which an average positive current flows through the inductor; a first transition following the first interval during which the first and fourth gate drive switches are turned OFF and the current flowing in the inductor charges and discharges capacitances coupled to the inductor; a second interval during which the second and third gate drive switches are ON and connect the second end of the inductor to the positive terminal and the first end of the inductor to the negative terminal during which an average negative current flows through the inductor; a second transition following the second interval during which the second and third gate drive switches are turned OFF and the current flowing in the inductor charges and discharges capacitances coupled to the inductor. The driver operating cycles may be characterized by a driver operating period. The switch controller may adjust the duration of the operating period, the duration of the first and second intervals, and the duration of the first and second transitions. At least one of the capacitances coupled to the inductor may include an input capacitance associated with one or more of the power train switches.

Another exemplary method of controlling power train switches in a power converter may include providing a gate drive circuit including a gate drive source having a positive terminal and a negative terminal, an inductor having a first end connected to a first node and a second end connected to a second node, a plurality of gate drive switches, including a first gate drive switch and a second drive switch connected to the first node, a third drive switch and a fourth gate drive switch connected to the second node, and a switch controller connected to operate the gate drive switches in a series of driver operating cycles. One or more input capacitances associated with the power train switches may be coupled to the inductor. The driver operating cycles, which may be characterized by a driver operating period, may include a first interval during which the first and fourth gate drive switches are ON and connect the first node to the positive terminal and the second node to the negative terminal during which an average positive current flows through the inductor; a first transition following the first interval during which the first and second gate drive switches are OFF and the current flowing in the inductor charges and discharges capacitances coupled to the first node; a second transition following the first interval during which the third and fourth gate drive switches are OFF and the current flowing in the inductor charges and discharges capacitances coupled to the second node; a second interval during which the second and third gate drive switches are ON and connect the second node to the positive terminal and the first node to the negative terminal during which an average negative current flows through the inductor; a third transition following the second interval during which the first and second gate drive switches are OFF and the current flowing in the inductor charges and discharges capacitances coupled to the first node; and a fourth transition following the second interval during which the third and fourth gate drive switches are OFF and the current flowing in the inductor charges and discharges capacitances coupled to the second node. The switch controller may be configured to adjust the following control variables during operation of the power converter: (a) the operating period, (b) the durations of the first and second intervals, (c) the durations of the first, second, third, and fourth transitions, (d) a first delay between the first and second transitions and a second delay between the third and fourth transitions.

Another exemplary method may include providing a power converter for converting DC power received from a converter input for delivery to a converter output at an essentially fixed voltage transformation ratio, K=Vout/Vin and an output resistance. Circuitry having a first input connected to the converter input for sensing the input voltage, a second input connected to the converter output for sensing the output voltage, may provide a signal proportional to a difference between the output voltage and a scaled replica of the input voltage. The signal may be used to determine the load current.

Alternate embodiments of the above exemplary methods may include one or more of the following features. The duration of the energy recycling intervals, $T_{ERI}$, may be adjusted to vary from a maximum, $T_{ERI-MAX}$, at times when the duration of the power transfer interval is set to the predetermined minimum, $T_{PTI-MIN}$, and to a minimum, $T_{ERI-MIN}$, at times when the duration of the power transfer interval is set to the predetermined maximum, $T_{PTI-MAX}$. The first predetermined threshold, $I_{L1}$, may be greater than or equal to 33 percent of the maximum load current, $I_{L-MAX}$. The first predetermined threshold, $I_{L1}$, may be greater than or equal to 50 percent of the maximum load current, $I_{L-MAX}$. The first predetermined threshold, $I_{L1}$, may be greater than or equal to 65 percent of the maximum load current, $I_{L-MAX}$. The second predetermined threshold, $I_{L2}$, may be approximately equal to the minimum load current, $I_{L-MIN}$. The minimum load, $I_{L-MIN}$, current may be zero. The predetermined minimum duration, $T_{PTI-MIN}$, may be greater than or equal to 25 percent of the characteristic resonant period. The predetermined minimum duration, $T_{PTI-MIN}$, may be in a range between 25 to 35 percent of the characteristic resonant period. The primary switches may be turned ON at times when a voltage across the respective switch, $V_{SW}$, is approximately zero. The primary switches may be turned ON at times when a voltage across the respective switch, $V_{SW}$, is less than 25 percent of a maximum voltage across the respective switch, $V_{SW-MAX}$, in the OFF state during normal operation. A non-isolated power train may be used. The input circuitry and at least a portion of the output circuitry may be connected in series across the source such that an absolute value of the input voltage $V_{IN}$ applied to the input circuitry is approximately equal to the absolute value of the DC source voltage $V_S$ minus a number N times the absolute value of the output voltage $V_{OUT}$, where N is at least 1.

The resonant circuit may further include a resonant capacitor, and a clamp switch may be provided to clamp the resonant capacitor; and the power transfer intervals may further include (i) first and second resonant intervals, each having a duration less than one half of the characteristic resonant period, during which the resonant current flows at the characteristic resonant frequency and (ii) a clamp interval occurring after the first resonant interval and before the second resonant interval and having a clamp duration during which the clamp switch is ON and provides a low impedance shunt across the resonant capacitor. The switch controller may adjust the clamp duration as a function of power delivered to the load. A predetermined maximum duration, $T_{PTI-MAX}$, greater than one half of the characteristic resonant period, may be established for each power transfer interval for conditions in which the load current, $I_L$, is greater than or equal to a fourth predetermined threshold, $I_{L4}$. The duration of each power transfer interval, $T_{PTI}$, may be adjusted from the predetermined full duration, $T_{PTI-FULL}$, to the predetermined maximum, $T_{PTI-MAX}$, as a function of variations in the load current, $I_L$, between the second threshold, $I_{L2}$, and the fourth threshold, $I_{L4}$.

The duration of the energy recycling intervals, $T_{ERI}$, may be adjusted as a function of the power delivered to the load. The duration of the energy recycling intervals, $T_{ERI}$, may be increased in response to a decrease in the power delivered to the load. The duration of each power transfer interval, $T_{PTI}$, may be controlled as a function of a primary current, $I_{PRI}$, flowing at the end of each power transfer interval. Circuitry having a first input connected to the input for sensing the input voltage, and a second input connected to the output for sensing the output voltage, may provide a signal proportional to a difference between the output voltage and a scaled replica of the input voltage and the switch controller may use the signal to monitor the load current. The temperature may be sensed and the signal may be adjusted to compensate for variations in an output resistance of the power conversion as a function of the temperature.

The switch controller may include a gate drive circuit including a gate drive source having a positive terminal and a negative terminal, an inductor having a first end and a second end, a plurality of gate drive switches, including a first, a second, a third, and a fourth gate drive switch, connected to drive the inductor, and a switch controller connected to operate the gate drive switches in a series of driver operating cycles. The driver operating cycles may include a first interval during which the first and fourth gate drive switches are ON and connect the first end of the inductor to the positive terminal and a second end of the inductor to the negative terminal during which an average positive current flows through the inductor; a first transition following the first interval during which the first and fourth gate drive switches are turned OFF and the current flowing in the inductor charges and discharges capacitances coupled to the inductor; a second interval during which the second and third gate drive switches are ON and connect the second end of the inductor to the positive terminal and the first end of the inductor to the negative terminal during which an average negative current flows through the inductor; a second transition following the second interval during which the second and third gate drive switches are turned OFF and the current flowing in the inductor charges and discharges capacitances coupled to the inductor. The driver operating cycles may be characterized by a driver operating period. The switch controller may be configured to adjust the duration of the operating period, the duration of the first and second intervals, and the duration of the first and second transitions. At least one of the capacitances coupled to the inductor may include an input capacitance associated with one or more of the primary switches.

The output circuitry may include one or more secondary switches and at least one of the capacitances coupled to the first and second ends of the inductor may include an input capacitance associated with one or more of the secondary switches. The output circuitry further may include one or more secondary switches. The inductor may be a transformer having a primary winding and one or more secondary windings coupled to one or more of the power train switches and the capacitances may include one or more input capacitances associated with the one or more power train switches. The driver operating cycle may include a clamp interval during which the second and fourth gate drive switches are ON, the first and second ends of the inductor are both connected to the negative terminal, and current flows through the inductor. A representation of the load current, $I_L$, may be produced. The controller may adjust the duration of the clamp interval as a function of the representation. The controller may adjust the duration of the driver operating cycle as a function of the representation. The controller may adjust the duration of the first and second intervals as a function of the representation. The controller may adjust the duration of the driver operating cycle, the duration of the first and second intervals, and the duration of the first and second transitions as a function of the representation. The controller may adjust the duration, $T_{PTI}$, of each power transfer interval, and the duration of each energy recycling interval as a function of the representation. A current monitor having a first input connected to monitor the input voltage and a second input connected to monitor the output voltage, may perform a scaling function to reduce at least one of the first or second inputs by a predetermined ratio, R, may produce a no-load reference value, may determine a difference value between the first or second input and the no-load reference value, and may scale the difference value to provide the representation of the load current, $I_L$. The no-load reference value may equal $V_{IN}$ multiplied by R. The predetermined ratio, R, may be an integer multiple of the voltage transformation ratio, K. Circuitry having a first input connected to the input for sensing the input voltage, a second input connected to the output for sensing the output voltage, may provide a signal proportional to a difference between the output voltage and a scaled replica of the input voltage and the switch controller may use the signal to monitor the load current. The signal may be adjusted to compensate for variations in an output resistance as a function of sensing the temperature.

Alternate embodiments of the above exemplary methods may include one or more of the following features. The inductor may be a transformer having a primary winding and one or more secondary windings each coupled to one or more power train switches. The capacitances may include one or more input capacitances associated with the one or more power train switches. The driver operating cycle may include a clamp interval during which the second and fourth gate drive switches are ON and the first end and second end of the inductor are both connected to the negative terminal and a current flows through the inductor. A representation of the output current of the power converter may be produced. The controller may adjust the duration of the clamp interval as a function of the representation. The controller may adjust the duration of the operating period as a function of the representation. The controller may adjust the duration of the first and second intervals as a function of the representation. The controller may adjust the duration of the operating period, the duration of the first and second intervals, and the duration of the first and second transitions as a function of the representation. The controller may adjust the converter operating period, the power transfer interval duration, and the energy recycling interval duration in the power converter as a function of the representation.

Alternate embodiments of the above exemplary methods and apparatus may include one or more of the following features. The temperature of the power converter may be sensed and the signal may be adjusted to compensate for variations in the output resistance as a function of the temperature.

DESCRIPTION OF THE DRAWINGS

FIGS. 4A, 4B, and 4C show block diagrams of gate-drive circuits for the converters of FIGS. 1A and 1B.

FIGS. 5A-5H show waveforms for a first operating point of the converter of FIG. 1.

FIGS. 6A-6H show waveforms for a second operating point of the converter of FIG. 1.

DETAILED DESCRIPTION

Figure 1A:
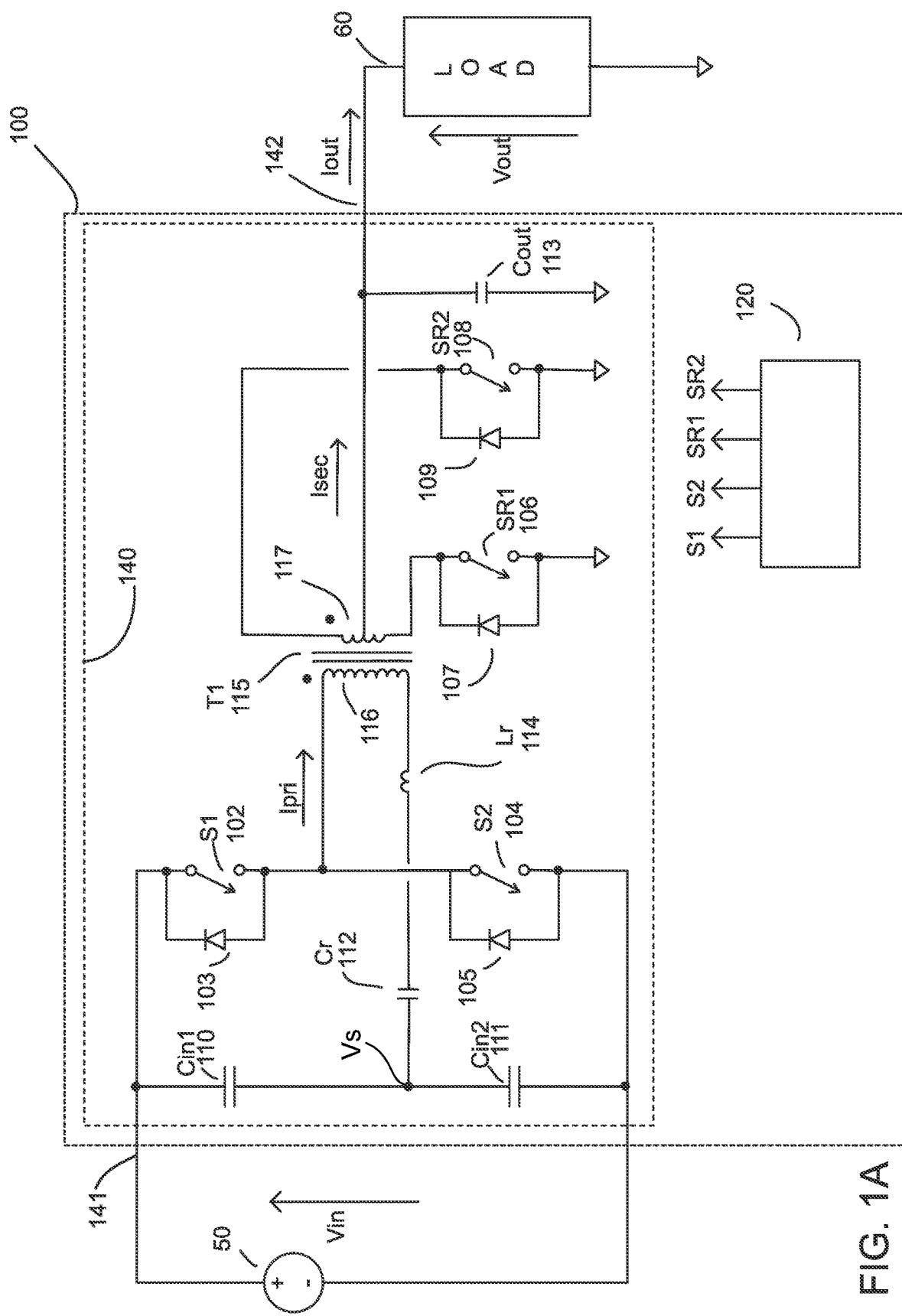
FIG. 1A and FIG. 1B are schematic circuit diagrams of an isolated and non-isolated Adaptive Sine Amplitude Converter.

A DC transformer as defined herein delivers a DC output voltage, Vout, which is a fixed fraction of the voltage, Vin, delivered to its input and optionally provides isolation between its input and its output. The voltage transformation ratio or voltage gain of the DC transformer (defined herein as the ratio, K=Vout/Vin, of its output voltage to its input voltage at a load current) is fixed by design, e.g. by the converter topology, its timing architecture, and the turns ratio of the transformer included within it. A category of DC transformer topologies, called Sine Amplitude Converters ("SACs"), are described in Vinciarelli, Factorized Power Architecture with Point of Load Sine Amplitude Converters, U.S. Pat. No. 6,930,893 issued Aug. 16, 2005; and in Vinciarelli, Point of Load Sine Amplitude Converters and Methods, U.S. Pat. No. 7,145,786 issued on Dec. 5, 2006, each assigned to VLT, Inc. and incorporated herein by reference in their entirety (the "SAC patents"). As disclosed in the SAC patents, a SAC operating cycle comprises two power transfer intervals ("PTI"), during which energy is transferred to the output by means of a substantially sinusoidal current characterized by a resonant frequency determined by component values within the SAC, and two energy recycling intervals, which may also be called "ZVS intervals," during which a transformer magnetizing current charges and discharges capacitances within the converter, thereby reducing or eliminating the voltage across a switch before it is turned ON, reducing switching losses in the converter. As also disclosed and illustrated in the SAC patents, the waveform of the rectified transformer secondary current in such a converter comprises a series of unidirectional half-sinusoidal pulses separated from one another by a ZVS interval. The amplitude of the half-sinusoidal pulses increases with increasing load. The operating frequency, the duration of each PTI, and thus the peak-to-peak magnetizing current in the converter may be substantially constant.

A clamped capacitor variation of the SAC topology is described in Vinciarelli, Clamped Capacitor Resonant Power Converter, U.S. Pat. No. 9,325,247 issued on April 26, 2016, assigned to VLT, Inc. and incorporated herein by reference in its entirety (the "CSAC patent"). As described in the CSAC patent, clamp switch circuitry may be connected across the resonant capacitor and operated during a clamp interval to short the resonant capacitor at or near the peak of the resonant current, i.e. between quarter resonant periods in the converter operating cycle. The effect of the clamp interval increases the ON time of the switches, extending the effective duration of the PTI, and reducing the effective series resistance of the converter, for more efficient operation under high load conditions. The peak-to-peak magnetizing current in the CSAC may therefore increase with introduction of the clamp interval. Familiarity with the basic timing architecture of the SAC and CSAC topologies (as described in the SAC patents and the CSAC patent) is assumed in the following description.

Figure 1B:
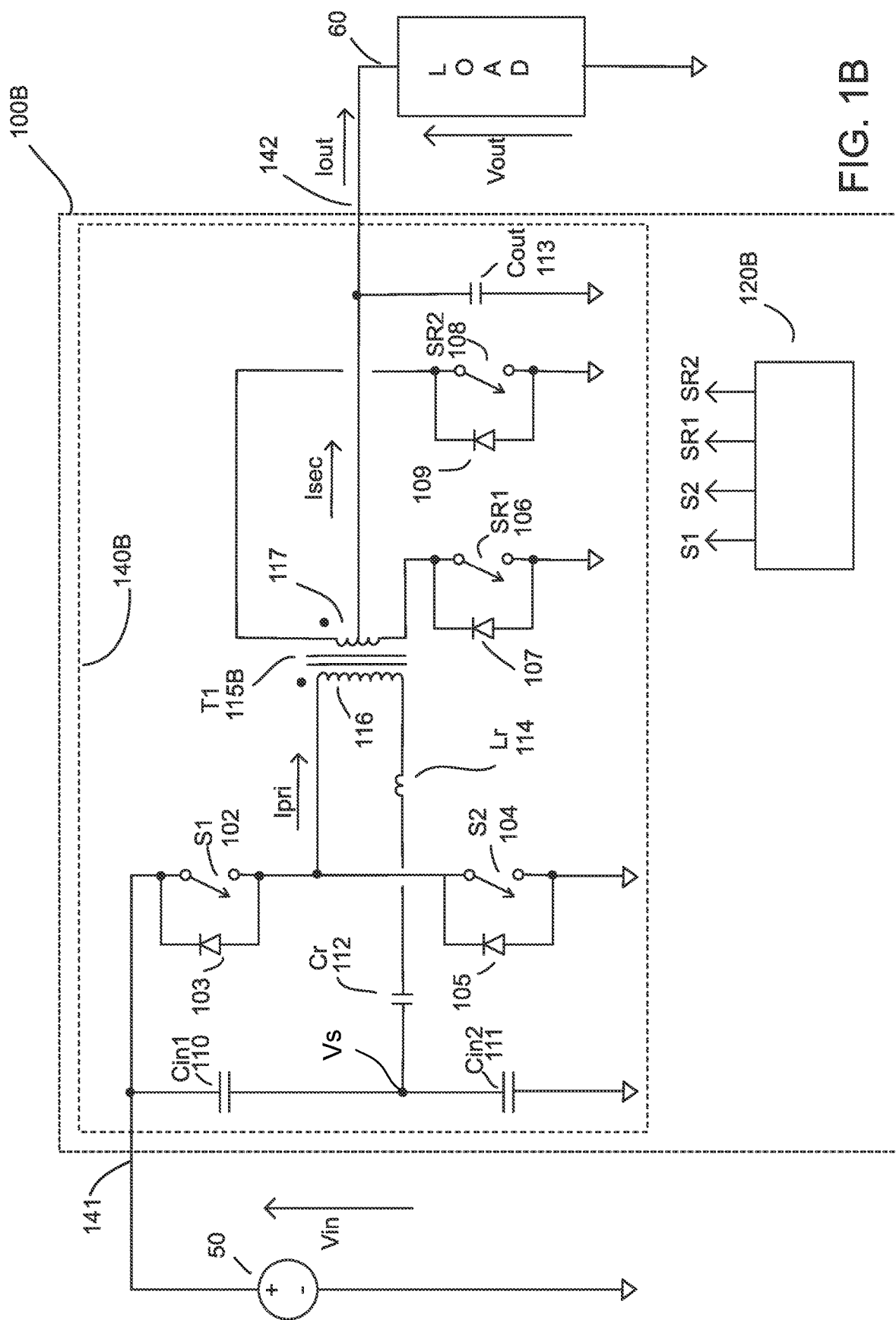

FIGS. 1A and 1B respectively show schematics of an isolated 100 and non-isolated 100B half-bridge Adaptive Sine Amplitude Converter ("ASAC") configured to reduce power dissipation in the converter while converting power received from source 50 for delivery to load 60 at light to no-load conditions. The ASAC 100, 100B may include a resonant capacitance $C_R$ 112; resonant inductance $L_R$ 114; a transformer T 115 having a primary winding 116 and secondary winding 117, the ratio of the primary turns to secondary turns defining a turns ratio, N, for the transformer; primary switches S1 102, S2 104, connected to drive the primary winding 116, secondary switches SR1 106, SR2 108, connected to rectify current from the secondary winding 117 for delivery to the load 60, each of the primary and secondary switches may include a respective diode 103, 105, 107, 109 (which may be an intrinsic part of the switch, as in a MOSFET, or which may be a discrete diode connected across the switch); input filter capacitors 110, 111 and output filter capacitor 113. The resonant inductor $L_R$ may comprise the leakage inductance of transformer T 115 either alone or in combination with other inductances, e.g. parasitic or component inductors external to the transformer. An ASAC controller 120 controls the timing of the opening and closing of the primary (S1, S2) and secondary (SR1, SR2) switches.

Figure 3A:
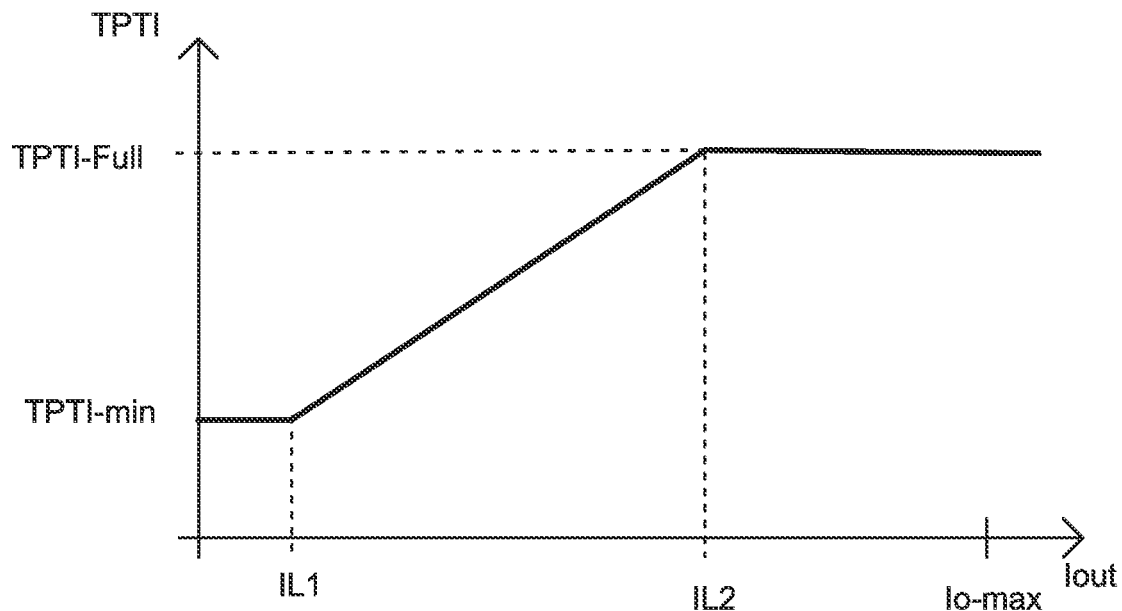
FIGS. 3A and 3B show transfer functions of PTI duration versus load for the converters of FIGS. 1A and 1B in ASAC, SAC, and CSAC modes of operation.

In operation, the ASAC controller 120 may actively adapt the operating cycle, including the duration of the power transfer intervals, $T_{PTI}$, to reduce power dissipation in the ASAC, particularly at light to no load conditions as explained below. FIG. 3A shows an adaptive relationship which may be used by the ASAC controller to vary the duration of the PTI, $T_{PTI}$, as a function of load to reduce losses at light or no-load conditions. As shown in FIG. 3A, the ASAC controller may operate the switches to: (a) use a minimum duration PTI, $T_{PTI-min}$, for load levels less than or equal to a first threshold, $I_{L1}$; (b) use a full duration PTI, $T_{PTI-Full}$, for load levels greater than or equal to a second threshold, $I_{L2}$; and (c) vary the duration of the PTI between the minimum, $T_{PTI-min}$, and the full, $T_{PTI-Full}$, durations as the load varies between the first threshold, $I_{L1}$, and the second threshold, $I_{L2}$. The preferred ranges for $T_{PTI-Full}$, $T_{PTI-min}$, $I_{L1}$, and $I_{L2}$ will be described in greater detail below.

Figure 2A:
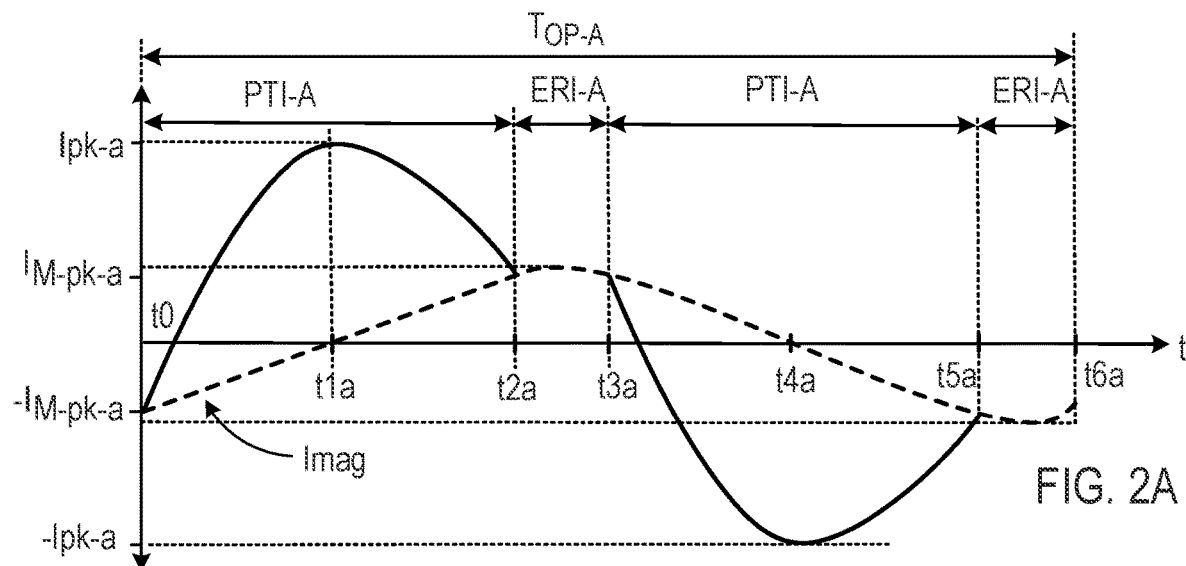
FIGS. 2A-2C show primary current waveforms for different operating points for the converter of FIGS. 1A and 1B.
Figure 2B:
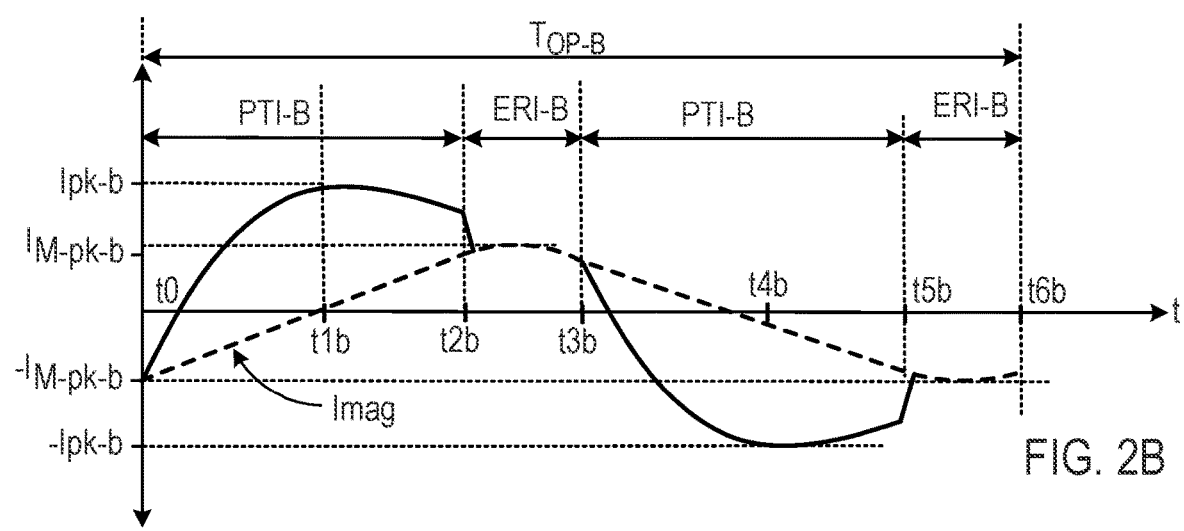
Figure 2C:
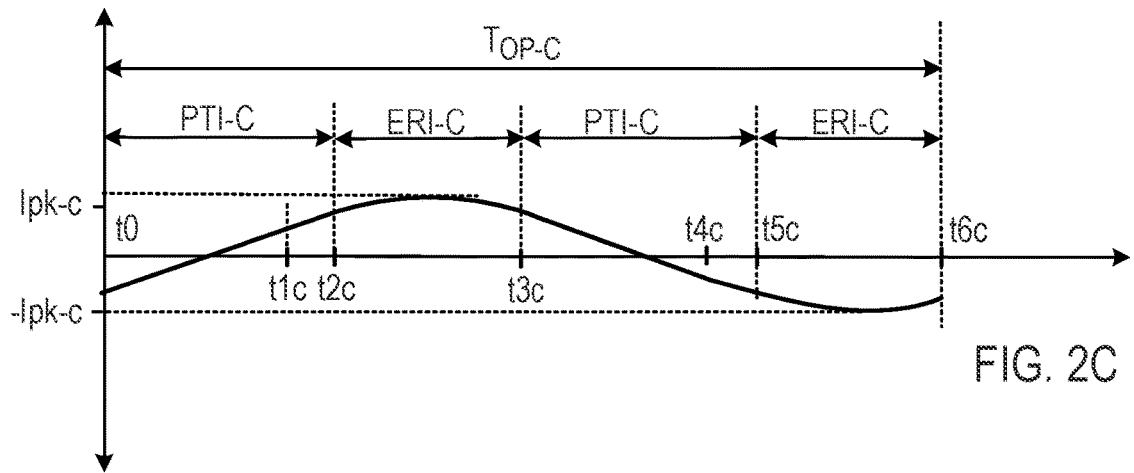

Steady-state waveforms for the current, $I_{PRI}$, flowing in the primary winding 116 of the ASAC topology of FIGS. 1A and 1B operating at a constant load are shown for three different load levels in FIGS. 2A through 2C (the input voltage is assumed to be constant for all three examples). Note that FIGS. 2A through 2C are intended to show generalized approximations of actual behavior and as such are not intended to reflect, nor should they be interpreted to represent, unnecessary detail. FIG. 2A shows the current, $I_{PRI}$, at a high load level, e.g. $I_{Load}$ greater than or equal to a second threshold load current, $I_{L2}$ ($I_{Load} \geq I_{L2}$). FIG. 2B shows the current, $I_{PRI}$, at an intermediate load level, e.g. $I_{Load}$ greater than a first threshold load current $I_{L1}$, and less than the second threshold load current, $I_{L2}$, ($I_L < I_{Load} < I_{L2}$). And FIG. 2C shows the current, $I_{PRI}$, at a low load level, e.g. $I_{Load}$ less than the first threshold load current, $I_{L1}$ ($I_{Load} \leq I_{L1}$). As shown, the peak current, $I_{pk-a}$, in FIG. 2A is greater than the peak current, $I_{pk-b}$, in FIG. 2B, which in turn is greater than the peak current, $I_{pk-c}$, in FIG. 2C illustrating the relative load conditions.

In the example shown in FIGS. 1A, 1B, and 2A-C, primary switch S1 102 and secondary switch SR1 106 are ON during the first PTIs (the PTIs starting at t0) and primary switch S2 104 and secondary switch SR2 108 are ON during the second PTIs (the PTIs starting at T3). The start of each ERI, begins when the primary switch that was ON during the immediately preceding PTI is turned OFF. The current flowing in the primary winding during the ERI, e.g. the magnetizing current, $I_M$, charges and discharges capacitances associated with the primary switching node, VS, reducing the voltage across the other primary switch before it is turned ON in the immediately succeeding PTI for full or partial ZVS turn ON. If the combination of magnetizing energy and the ERI duration are sufficient, the capacitances associated with each switch may be substantially charged and discharged enabling each to be turned ON at substantially zero volts without switching losses associated with discharging of charged circuit capacitances. The ERI, as well as the first half-cycle, may end at time $t_3$ when switches S2 104 and SR2 108 are turned ON initiating the second half cycle. As shown in FIGS. 2A through 2C, the progression of the second half-cycle between times $t_3$ and $t_6$ is the same as the progression of the first half-cycle, the difference being the polarity of the voltages and currents during the respective intervals. The converter operating cycle ends at time $t_6$, with the completion of the ZVS interval of the second half-cycle.

At time $t_0$ primary switch S1 may be turned ON initiating a PTI. As shown in FIGS. 2A, 2B, the primary current during each PTI is the sum of the (a) primary-reflected secondary current, $I_O(t)/N$, and (b) magnetizing current, $I_{MAG}$ (shown as a dashed line): $I_p(t)=I_O(t)/N+I_{MAG}(t)$. With the primary switch S1 102 ON, one half of the input voltage, $V_{IN}$, is impressed across the series circuit including $C_R$ 112, $L_R$ 114, and primary winding 116, causing: the output current $I_O(t)$ and thus the primary-reflected output current, $I_O(t)/N$, to ring up sinusoidally at the characteristic resonant frequency $f_R=1/(2*\pi*\text{sqrt}(L_R*C_R))$; and current to build in the magnetizing inductance of the transformer, $I_M$, during the PTI, increasing (or decreasing) from its approximate negative (or positive) peak at the beginning of the PTI to its approximate positive (or negative) peak at the end of the PTI. As shown in FIGS. 2A and 2B, at time $t_1$, e.g. $t_{1a}$, $t_{1b}$, the resonant portion of the primary current $I_O(t)/N$ reaches a peak, the value of which increases with the magnitude of the average current drawn by the load 60, at a time which essentially coincides with the magnetizing current passing through zero. The primary current in the examples of FIG. 2A and FIG. 2B reaches peak values of $I_{pk-a}$, $-I_{pk-a}$, and $I_{pk-b}$, $-I_{pk-b}$, respectively which also represent the resonant peak current since the magnetizing current, $I_{MAG}$, is essentially zero at time $T_1$. By contrast, the primary current as depicted in FIG. 2C, representing operation of the ASAC at no-load: $I_L=0 \le I_{L1}$, includes only the magnetizing current component because the load current and thus the primary-reflected load current, are zero. As shown, the magnetizing current reaches its peak, $I_{M-pk}$, $-I_{M-pk}$, in all three examples after the PTI ends.

As shown in FIG. 2A representing operation of the ASAC at a high load condition ($I_{Load} \ge I_{L2}$: FIG. 3A) that generally coincides with the constant ON time control described in the SAC patents, the ASAC controller operates the switches to establish the power transfer intervals, PTI-A, with a duration, $T_{PTI-A}=T_{PTI-Full}$, which, in a preferred embodiment, is approximately equal to one half of the characteristic resonant period, $T_R/2$, ($T_{PTI-A}=T_{PTI-res}=T_R/2$) allowing the resonant portion of the primary current to return to substantially zero for ZCS of the secondary switches and near ZCS of the primary switches. Near ZCS because only magnetizing current is flowing when the primary switches are turned ON and OFF. For example, at time t0, the ASAC controller closes primary switch S1 102 initiating power transfer interval, PTI-A, when the magnitude of $I_O$ is zero and the primary current $I_P$ is substantially equal to the peak negative value of the magnetizing current, $I_p(t_0)=-I_{M-pk}=-I_{M-pka}$. Similarly, the ASAC controller opens switch S1 at time $t_{2a}$ when the magnitude of $I_O$ is zero and the primary current $I_P$ is substantially equal to the peak positive value of the magnetizing current, $I_P(t_0)=+I_{m-pk}=+I_{m-pka}$, ending PTI-A and beginning ERI-A.

Operation of the ASAC will now be described in connection with the waveform in FIG. 2B which represents an intermediate load condition ($I_{L1}<I_{Load}<I_{L2}$: FIG. 3A). The ASAC controller may turn switch S1 102 ON at time to initiating power transfer interval, PTI-B. As shown, the primary current rings up sinusoidally at the characteristic resonant frequency, reaching its peak at the same time, t1, ($t_{1a}=t_{1b}$) as shown in FIG. 2A illustrating the same characteristic resonant frequency. However, as illustrated in FIG. 2B, the ASAC controller turns primary switch S1 102 OFF at time, $t_{2b}$, ending power transfer interval PTI-B before the resonant current rings down to zero, resulting in a duration, $T_{PTI-B}$, that is shorter than the duration, $T_{PTI-A}$, of PTI-A. Turning OFF switch S1 102 earlier than one half of the characteristic resonant period, $T_R/2$, after the start of the PTI, e.g. at time, $t_0$, ($T_{PTI-B}<T_{PTI-res}=T_R/2$), truncates the resonant current before the end of the half-cycle as shown in FIG. 2B at time $t_{2b}$, where the primary current is shown abruptly decreasing to the level of the magnetizing current. The resulting loss of ZCS (beyond the level of magnetizing current) with the truncated PTI, may be a worthwhile tradeoff for the resulting reduction in the peak level of the magnetizing current, which in turn can reduce permeable-core losses and conduction losses in the switches and windings, increasing overall efficiency at light loads. Reduced magnetizing current increases ERI-B, the time necessary to charge and discharge the capacitances associated with the switching node VS during the energy recycling intervals, which are accordingly illustrated with a longer duration in FIG. 2B compared to ERI-A in FIG. 2A.

A low load condition ($I_{Load}<I_{L1}$ in FIG. 3A) may be represented by the primary current waveform shown in FIG. 2C. As described below, FIG. 2C more specifically represents a no-load condition (which also meets the more generalized condition shown in FIG. 3A) in an ASAC having ideal components which results in zero resonant current throughout the power transfer interval, PTI-C: $I_{RES-PTI-C}=I_O(t)/N=0$. The ASAC controller may turn switch S1 102 ON at time $t_0$ initiating power transfer interval, PTI-C. As shown the primary current ramps up linearly while switch S1 is ON from time $t_0$ to time $t_{2c}$. Because the load is zero and the components are assumed to be ideal, no resonant current flows as shown in FIG. 2C. As illustrated in FIG. 2C, the ASAC controller turns primary switch S1 102 OFF at time, $t_{2c}$, ending power transfer interval PTI-C, resulting in a duration, $T_{PTI-C}$, that is even shorter than the duration, $T_{PTI-B}$, of PTI-B. Turning OFF switch S1 102 even earlier, further reducing the duration of the PTI, further reduces the peak magnetizing current, $I_{M-pk}$. As shown, the peak magnetizing current, $I_{M-pk}$ is at the highest level, $I_{M-pk-a}$, in the example of FIG. 2A, the lowest level, $I_{M-pk-c}$, in the example of FIG. 2C, and an intermediate level, $I_{M-pk-b}$, in the example of FIG. 2B, illustrating the dependency on the duration of the PTI, which is shown as the longest in FIG. 2A, shortest in FIG. 2C, and intermediate duration in FIG. 2B. Note that the waveforms of FIGS. 2A through 2C assume that the input voltage is the same for all three examples.

The even lower magnetizing current in the example FIG. 2C requires even more time to charge and discharge the capacitances associated with the switching node VS during the energy recycling intervals, thus intervals, ERI-C, are shown with an even longer duration in FIG. 2C (compared to ERI-B in FIG. 2B). The inverse relationship between the PTI duration (and consequent change in magnetizing current) and the ERI duration partially offset each other allowing the converter operating period, $T_{OP}$, to remain within a relatively narrow range as illustrated in FIGS. 2A through 2C. In one example, an ASAC having a characteristic resonant period of 100 nS, may be operated at high loads ($I_{Load} \ge I_{L2}$: FIG. 3A) with an operating period, $T_{OP-A}=250$ nS, ($F_{OP}=4$ MHz), a PTI duration, $T_{PTI-A}=96$ nS, and an ERI duration, $T_{ERI-A}=29$ nS as shown in FIG. 2A; and at light load to no load ($I_{Load}<I_{L1}$: FIG. 3A) with an operating period, $T_{OP-C}=204$ nS, ($F_{OP}=5$ MHz), a PTI duration, $T_{PTI-C}=59$ nS, and an ERI duration, $T_{ERI-C}=44$ nS as shown in FIG. 2C. Thus a nearly forty percent reduction in PTI duration may result in only twenty percent reduction in operating period thanks to the increase in ERI duration.

As described above, terminating the PTIs early reduces the magnetizing current flowing in the transformer, thus reducing power dissipation in the core and in the windings, potentially improving efficiency of the converter, e.g. at reduced loads. Increasing the duration of the ERIs helps maintain the converter operating period within a relatively narrow range even with large reductions in the PTI duration.

Figure 3B:
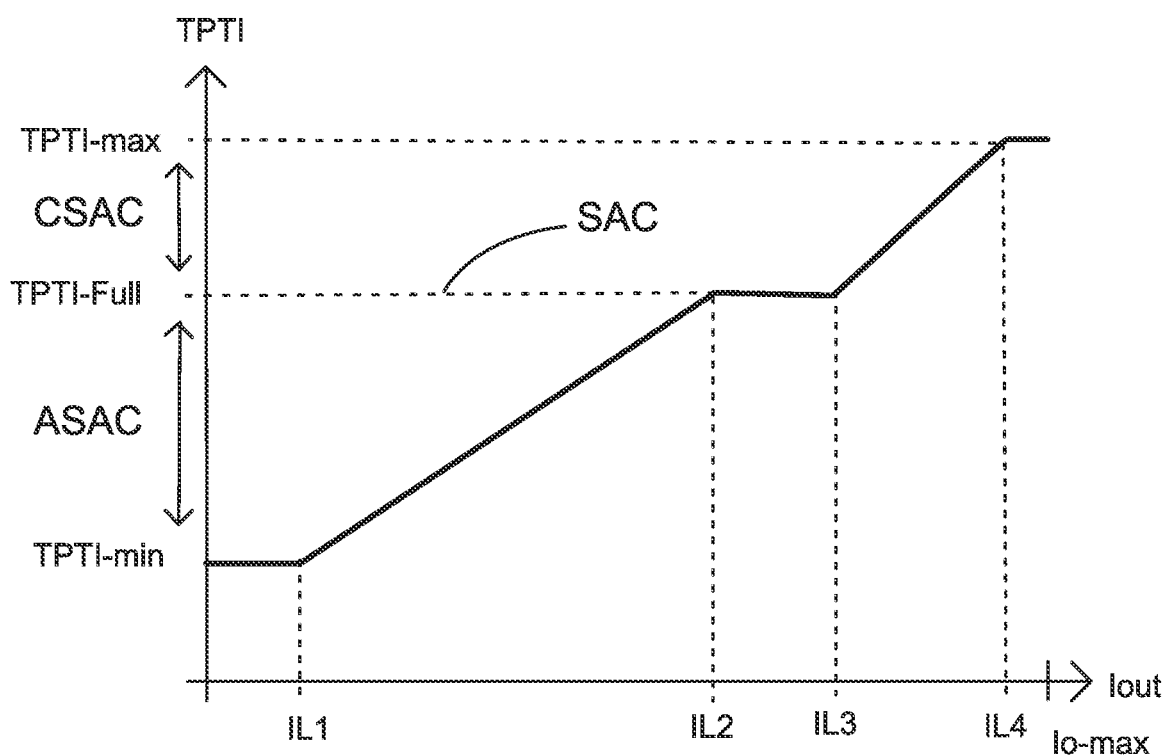

FIG. 3A shows the relationship between load and PTI duration between $I_{L1}$ and $I_{L2}$ as essentially linear, however any suitable relationship may be used. In a preferred embodiment, the ASAC controller may use the following ranges for the parameters shown in FIG. 3A: (a) the minimum PTI duration, $T_{PTI\text{-}min}$, may preferably be in the range of 60 to 75 percent of the half resonant period ($0.6* T_R/2) \leq T_{PTI\text{-}min} \leq (0.75\ T_R/2)$, but may be 50 percent or even lower; (b) the full PTI duration, $T_{PTI\text{-}Full}$, may preferably be in the range of 95 to 100 percent of the half resonant period, $(0.95*\ T_R/2) \leq T_{PTI\text{-}Full} \leq (T_R/2)$, but $T_{PTI}$ may exceed this upper limit with the clamp capacitor methods described in the CSAC patent (e.g. as shown in FIG. 3B and discussed below, $T_{PTI}$ may vary between $T_{PTI\text{-}Full}$ and $T_{PTI\text{-}max}$ for operation as a CSAC) ; (c) the lower current threshold, $I_{L1}$, may be between 0 and 5 or 10 percent of the full load current, $0 \leq I_{L1} \leq 0.05$ to $0.10 * I_{L\text{-}max}$; (d) the upper current threshold, $I_{L2}$, for ASAC operation may be between 20 and 100 percent of the full load current, $0.2 * I_{L\text{-}max} \leq I_{L1} \leq I_{L\text{-}max}$. The ASAC controller may additionally adjust the timing to control the level of current chop in the primary switches over the load range, $I_{PRI}(T_{PTI})=I_{Chop\text{-}Set}$. For example, the controller may adjust the PTI duration to control the level of primary current at the end of the PTI, e.g. turning the primary switches OFF earlier to decrease the level of magnetizing current, $I_{MAG}$, and increase the level of resonant current, $I_{RES}$, being chopped or later to increase the level of magnetizing current, $I_{MAG}$, and decrease the level of resonant current, $I_{RES}$, being chopped: Ipri(PTI-end)=Imag(PTI-end)+Ires (PTI-end)=$I_{Chop\text{-}Set}$. The controller may maintain a constant current chop, $I_{Chop\text{-}Set}$=constant, or ensure that a predetermined maximum current chop is not exceeded, $I_{Chop\text{-}Set}$<maximum. For example, the controller may limit the duration of the PTI even at high loads thus increasing the level of current chopped by turning OFF the primary switches early, e.g. to reduce power loss in the converter.

Figure 4A:
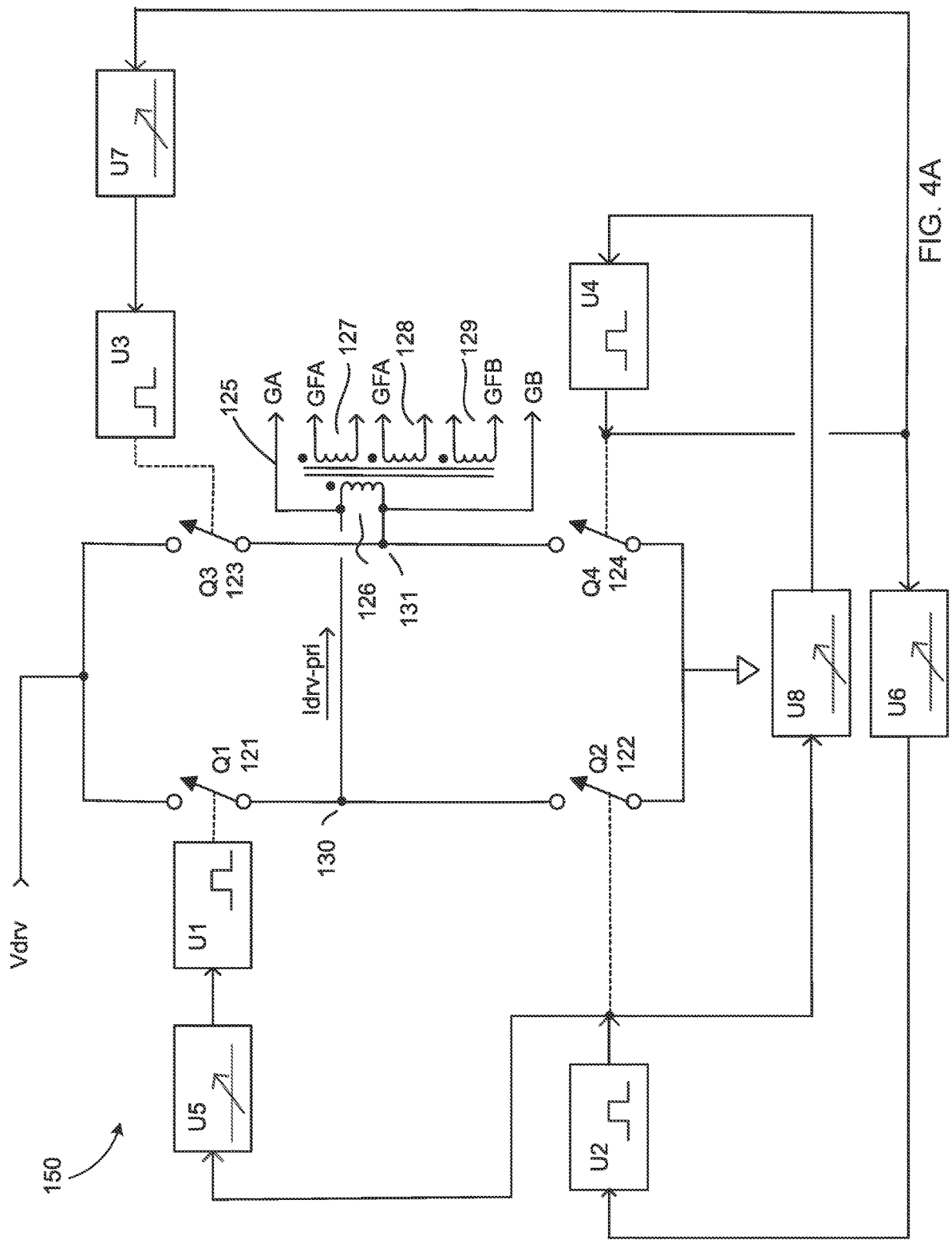

Referring to FIGS. 4A and 4B an improved gate-drive circuit 150 for controlling the primary and secondary switches of an ASAC is shown having four gate-drive switches, Q1 121, Q2 122, Q3 123, Q4 124, connected in a full-bridge configuration driving the primary winding 126 of gate-drive transformer 125. Power-train switches not requiring isolation and having a ground-referenced control terminal, such as primary switch S2 in FIG. 1A or secondary switches in non-isolated power trains such as secondary switches SR1 and SR2 in FIG. 1B, may be driven directly by nodes GA and GB of the gate-drive circuit. The remaining power-train switches such as floating switches (e.g. primary switch S1 in FIGS. 1A and 1B) and secondary switches in isolated power trains (e.g. SR1 and SR2 in FIG. 1A) may be driven by a respective secondary winding, e.g. secondary windings 127, 128, and 129 (FIG. 4A) and 127B (FIG. 4B) of the gate-drive transformer 125 (FIG. 4A), 125B (FIG. 4B). For example, in the isolated power train 140 of FIG. 1A using the driver 150 of FIG. 4A, primary switch S1 may be driven by secondary winding 127 signal GFA, ground-referenced primary switch S2 may be driven directly by node GB, secondary switch SR1 may be driven by secondary winding 128 signal GFA, and secondary switch SR2 may be driven by secondary winding 129 signal GFB. In the non-isolated power train 140B of FIG. 1B using the driver 150B of FIG. 4B, primary switch S1 may be driven by secondary winding 127B signal GFA, ground-referenced primary switch S2 and secondary switch SR2 may be driven directly by node 131 signal GB, and ground-referenced secondary switch SR1 may be driven directly by node 130 signal GA. In another non-isolated example, ground-referenced primary switch S2 may also be driven by a secondary winding (not shown in FIG. 4B) for symmetry with floating primary switch S1. Note the driver 150B may be simplified to use a gate-drive transformer 125B having a single secondary winding 127B as shown in FIG. 4B for use with the non-isolated half-bridge ASAC 100B. Power to the full bridge is supplied by the gate-drive bias input, Vg-drv. Note that the polarity and turns ratios of the secondary windings 127, 128, and 129 (FIG. 4A) and 127B (FIG. 4B) may be configured to ensure, and the following discussion assumes, that the switches connected to be controlled by voltages GFA and GFB operate at times that essentially coincide with the timing of switches connected to be controlled directly by voltages GA and GB.

Pulse blocks U1, U2, U3, and U4 each generate an output pulse having a respective duration, tp1, tp2, tp3, tp4, when triggered by an input signal. The output of each pulse block is connected to the control terminal of a respective gate-drive switch Q1, Q2, Q3, Q4. The respective pulse duration, tp1, tp2, tp3, tp4, of each pulse block may be controlled independently, e.g. by a digital or analog input signal (not shown) to each pulse block. Delay blocks U5, U6, U7, and U8, when triggered by an input signal, each provide an output signal after a respective delay, td5, td6, td7, td8. The delay td5, td6, td7, td8 for each delay block, U5, U6, U7, and U8, may be set independently, e.g. by an analog or digital input signal (not shown) to each delay block. The ON time of each of the gate-drive switches, Q1, Q2, Q3 and Q4 is thus controlled by pulse blocks U1, U2, U3, and U4, i.e. tp1, tp2, tp3, and tp4, respectively. The idealized waveforms, 5A, 5B, 5C, and 5D in FIGS. 5 and 6A, 6B, 6C, and 6D in FIG. 6, are therefore also representative of the respective states of gate-drive switches Q1, Q2, Q3, and Q4, with a high waveform signal representing the ON state and a low waveform signal representing the OFF state.

Operation of the gate-drive control circuit of FIGS. 4A and 4B will be explained in connection with the waveforms of FIGS. 5 and 6. Referring to waveforms 5A and 5B in FIG. 5, the duration of the operating cycle, Top-A (FIG. 5), Top-B (FIG. 6) of the converter may be set by pulse blocks U2 and U4 and delay blocks U6 and U8. The output of U2 turns OFF at time tx1, triggering delay block U8, which after the delay, td8, at time tx2 (tx2=tx1+td8) triggers pulse block U4, which in turn outputs a pulse having a duration tp4 beginning at time tx2 and ending at time tx5. At time tx5 (tx5=tx2+tp4), the output pulse of U4 ends, triggering delay block U6. After the delay, td6, at time tx6 (tx6=tx5+td6), pulse block U2 outputs a pulse having a duration tp2 beginning at time tx6 and ending after tp2, at time tx9=tx6+tp2=tx1+Top, which marks the end of the cycle and the beginning of the next cycle, e.g. triggering delay block U8, etc. Accordingly, the operating period may be set by the sum of these four time parameters, pulse durations, tp2 and tp4, and delays td6 and td8.

Referring to FIG. 5, the output of U2 resets at time tx1 turning switch Q2 OFF, and triggering delay blocks U8 and U5 (as shown in FIGS. 4A, 4B, and 5) starting a new operating cycle, and allowing the current that is flowing in primary winding 126 and in the secondary windings to respectively charge node 130 and nodes connected to GFA toward the potential of Vdrv and continue to discharge node 131 toward ground and nodes connected to GFB to their respective minima. At time t0 corresponding with t0 in FIG. 2A-2C, the voltages GFA across windings 127 and 128 (FIG. 4A) and 127B (FIG. 4B) (all corresponding with direct coupled node 130, GA) reach the level Vt necessary to turn ON their respective power-train switches, primary switch S1 and secondary switch SR1 in the isolated example of FIG. 1A & 4A. With power-train switches S1 and SR1 ON, a power transfer interval in the power train 140 begins with the current, Ipri, (waveform 5G) in the primary winding 116 of transformer 115 (FIG. 1A) and secondary current, Isec, (waveform 5H) in the secondary winding 117 increasing as shown in FIG. 5 (and as discussed above in connection with FIG. 2A). It should be appreciated that the capacitances associated with the control terminals of the power-train switches, e.g. gate capacitance of MOSFETS, being connected to the gate-drive nodes directly (nodes 130, 131) or through transformer windings (nodes GFA, GFB), will be discharged and charged during the transition of voltages GA, GFA and GB, GFB described in connection with FIGS. 4A and 4B.

After the delay, td8, of delay block U8, i.e. at time tx2 (tx2=tx1+td8), delay block U8 outputs a signal triggering pulse block U4 which turns gate-drive switch Q4 ON, connecting node 131 to ground. Note that FIG. 5 is intended to show generalized approximations of actual behavior and as such is not intended to reflect, nor should they be interpreted to represent, unnecessary detail. For example, time tx2 and time t0 occur close in time as illustrated in FIG. 5, however, the two are not directly correlated in the controller shown in FIGS. 4A and 4B, e.g. tx2 is controlled by td8 while t0 is controlled by many factors including tx1, the threshold Vt, the magnitude of current flowing in the gate drive transformer, and the cumulative capacitance on the gate drive node. Under ideal conditions, node 131 will be discharged to the ground potential (GB =0), allowing gate-drive switch Q4 to be turned ON with zero voltage across it for full ZVS operation at time tx2. After the delay, td5, of delay block U5 at time tx3 (tx3=tx1+td5), delay block U5 outputs a signal triggering pulse block U1 which turns gate-drive switch Q1 ON. Under ideal conditions, node 130 will be charged to the potential of Vdrv (GA=Vdrv), allowing gate-drive switch Q1 to be turned ON with zero voltage across it for full ZVS operation at time tx3. Although shown as substantially different, delays td5 and td8 may be nearly the same, causing tx2 and tx3 to be nearly coincident. With gate-drive switches Q1 and Q4 ON, at time tx3 gate-drive signals GA and GFA are at their maximum (GA=Vdrv) and signals GB and GFB are at their minimum (GB=0). Current flowing through the primary winding of the gate drive transformer reverses direction after tx3.

The output of U1 resets after the duration, tp1, at time tx4 (tx4=tx3+tp1) turning gate-drive switch Q1 OFF, allowing the current flowing in the primary winding 126 of the gate-drive transformer 125 to discharge node 130, causing the voltage GA to decrease toward ground potential and the current flowing in the secondary windings 127 and 128 to discharge the secondary nodes GFA to decrease toward their respective minima. At time t2a corresponding with t2a in FIG. 2A, the voltages across secondary windings 127 and 128 (FIG. 4A) and 127B (FIG. 4B) (all corresponding with direct coupled node 130, GA) reach the level Vt which turns their respective power-train switches OFF, e.g. S1 and switch SR1 in the isolated example, ending the PTI and beginning the EM transition of power-train node VS (FIGS. 1A, 1B) for ZVS operation of power-train switch S2. Note that time tx5 and time t2a occur close in time as illustrated in FIG. 5, however, the two are not directly correlated in the controller shown in FIGS. 4A and 4B, e.g. tx5 is controlled by tp4 while t2a is controlled by many factors including tx4, the threshold Vt, the magnitude of current flowing in the gate drive transformer and the cumulative capacitance on the gate-drive node.

The output of U4 resets after the duration, tp4, at time tx5 (tx5=tx2+tp4), triggering delay blocks U6 and U7 and turning gate-drive switch Q4 OFF, allowing the current flowing in the primary winding 126 of the gate-drive transformer 125 to charge node 131, causing the voltage GB to increase toward its maximum (Vdrv) and the current flowing in the secondary winding 129 to charge the secondary node GFB to increase toward its maximum. At time t3a corresponding with t3a in FIG. 2A, the voltage GB at node 131 reaches the level Vt which turns power-train switch S2 ON (and the voltage GFB reaches a level that turns power-train switch SR2 ON), ending the EM and beginning the next PTI of the power train (FIGS. 1A and 1B). With power-train switches S2 and SR2 ON, a power transfer interval in the power train begins with the current, Ipri, (waveform 5G) in the primary winding 116 of transformer 115 (FIGS. 1A, 1B) decreasing and secondary current, Isec, (waveform 5H) in the secondary winding 117 increasing as shown in FIG. 5 (and as discussed above in connection with FIG. 2A).

After the delay, td6, of delay block U6, i.e. at time tx6 (tx6=tx5+td6), delay block U6 outputs a signal triggering pulse block U2 which turns gate-drive switch Q2 ON, connecting node 130 to ground. Note that time tx6 and time t3a occur close in time as illustrated in FIG. 5, however, the two are not directly correlated in the controller shown in FIGS. 4A and 4B, e.g. tx6 is controlled by td6 while t3a is controlled by many factors including tx5, the threshold Vt, the magnitude of current flowing in the gate drive transformer, and the cumulative capacitance on the gate drive node. Under ideal conditions, node 130 will be discharged to the ground potential (GA=0), allowing gate-drive switch Q2 to be turned ON with zero voltage across it for full ZVS operation at time tx6. After the delay, td7, of delay block U7 at time tx7 (tx7=tx5+td7), delay block U7 outputs a signal triggering pulse block U3 which turns gate-drive switch Q3 ON. Under ideal conditions, node 131 will be charged to the potential of Vdrv (GB=Vdrv), allowing gate-drive switch Q3 to be turned ON with zero voltage across it for full ZVS operation at time tx7. Although shown as substantially different, delays td6 and td7 may be nearly the same, causing tx6 and tx7 to be nearly coincident. With gate-drive switches Q2 and Q3 ON, at time tx7 gate-drive signals GB and GFB are at their maximum (GB=Vdrv) and signals GA and GFA are at the minimum (GA=0). Current flowing through the primary winding of the gate drive transformer reverses direction after tx7.

The output of U3 resets after the duration, tp3, at time tx8 (tx8=tx7+tp3) turning gate-drive switch Q3 OFF, allowing the current flowing in the primary winding 126 of the gate-drive transformer 125 to discharge node 131, causing the voltage GB to decrease toward ground potential and the current flowing in the secondary winding 129 to discharge the secondary node GFB to decrease toward its minimum. At time t5a corresponding with t5a in FIG. 2A, the voltage GB at node 131 reaches the level Vt which turns power-train switch S2 OFF (and the voltage GFB reaches a level that turns power-train switch SR2 OFF), ending the PTI and beginning the ERI transition of power-train node VS (FIGS.

1A, 1B) for ZVS operation of power-train switch S1. The output of U2 resets after the duration, tp2, restarting the operating cycle at time tx1+Top (tx1+Top=tx6+tp2). Note that time tx1 and time t5a occur close in time as illustrated in FIG. 5, however, the two are not directly correlated in the controller shown in FIGS. 4A and 4B, e.g. tx1 is controlled by tp2 while t5a is controlled by a variety of factors including tx8, the threshold Vt, the magnitude of current flowing in the gate drive transformer, and the cumulative capacitance on the gate-drive node.

To summarize, the PTI duration of the power train, which comprises tp1 and tp3, may be shortened or extended by varying tp1 and tp3 of pulse blocks U1 and U3, respectively, while also varying the parameters of other pulse blocks, U2 and U4, and delay blocks, U5, U6, U7 and U8. The overall operating period of the converter may be controlled using the parameters, tp2, tp4, td6, and td8. The EM durations in the power train, and its ZVS operation with varying PTI duration, may be controlled using tp1, tp2, tp3, tp4, td5, td6, td7 and td8. However, these eight parameters are not independent of one another since, in steady state operation, symmetry between complementary PTIs and ERIs, causes essential equality between tp1 and tp3, tp2 and tp4, td5 and td7, and tp6 and tp8, thus reducing the number of independent control parameters from eight to four. With its operational timing parameters, the gate-drive control circuits of FIGS. 4A and 4B control the PTI duration of the power train and the EM duration of the power train, thus controlling the overall operating period of the ASAC topology, as well as the duration of the ZVS transitions of GA and GB. As such, the gate-drive control circuits of FIGS. 4A and 4B enable ZVS operation of the S1, S2, SR1 and SR2 power switches under varying ASAC operating conditions, as well as ZVS operation of the Q1, Q2, Q3 and Q4 gate drive switches. ZVS operation of power train switches and gate drive switches improves efficiency under a broad range of ASAC operating conditions. Timing parameters may be digitally set, and adaptively reset, using look-up tables as a function of converter load.

Referring to FIG. 6, waveforms 6A through 6H illustrate operation of the gate-drive circuit for controlling the switches in the ASAC for an intermediate load condition ($I_{L1} < I_{Load} < I_{L2}$: FIG. 3A) in which, consistent with the operation discussed above in FIG. 2B, the primary switch S1 102 is turned OFF at time, $t_{2b}$, ending power transfer interval PTI-B before the resonant current rings down to zero, resulting in a duration, $T_{PTI-B}$, that is shorter than one half of the characteristic resonant period, $T_R/2$ ($T_{PTI-B} < T_R/2$). As shown in waveforms 6C and 6D of FIG. 6, the durations, tp1 and tp3, of pulse blocks U1 and U3 have been shortened relative to that shown in FIG. 5, turning OFF switches Q1 and Q3 earlier. As a result, gate-drive voltages GA, GFA and GB, GFB begin declining earlier reaching the control voltage, Vt, earlier, and thus turning OFF the respective power-train switches earlier, truncating the PTIs as illustrated in waveforms 6G and 6H. The secondary switches SR1 and SR2 may be turned OFF at the same time as their respective primary switches S1 and S2. In the example shown in FIG. 6, the duration of the energy recycling intervals, EM-B may also be lengthened, e.g. using the timing parameters, pulse durations, tp1-tp4 and time delays, td5-td8, illustrated in the gate-drive control circuits of FIGS. 4A and 4B, providing flexibility for controlling the various timing relationships of the ASAC power train under different operating conditions. Note that FIG. 6 is intended to show generalized approximations of actual behavior and as such is not intended to reflect, nor should the approximations be interpreted to represent, unnecessary detail. For example, times tx2 and t0, and times tx6 and t3b respectively occur close in time as illustrated but are not directly correlated as explained above in connection with FIG. 5.

As shown in the examples of FIGS. 5 and 6, the gate drive circuits 150, 150B may control the rise and fall of the gate drive voltages, e.g. GA, GB, independently of each other. In the example of FIG. 5, the voltage GB rises before the voltage GA falls to ground thus reducing the time that the power train switches, e.g. S1 and S2 are both OFF. In the example for FIG. 6, the voltage GB rises after the voltage GA falls to ground thus increasing the time that the power train switches, e.g. S1 and S2 are both OFF. The gate drive circuits 150, 150B of FIGS. 4A and 4B may be further modified to provide clamping of the gate drive transformer for extended periods with the gate drive voltages GA, GB to remain at ground potential. For example a modified gate drive circuit 150C shown schematically in FIG. 4C is similar to the driver 150B in FIG. 4B, but includes additionally circuitry to allow gate drive switches Q2 and Q4 to be operated simultaneously to clamp the gate drive transformer 125B.

Figure 4C:
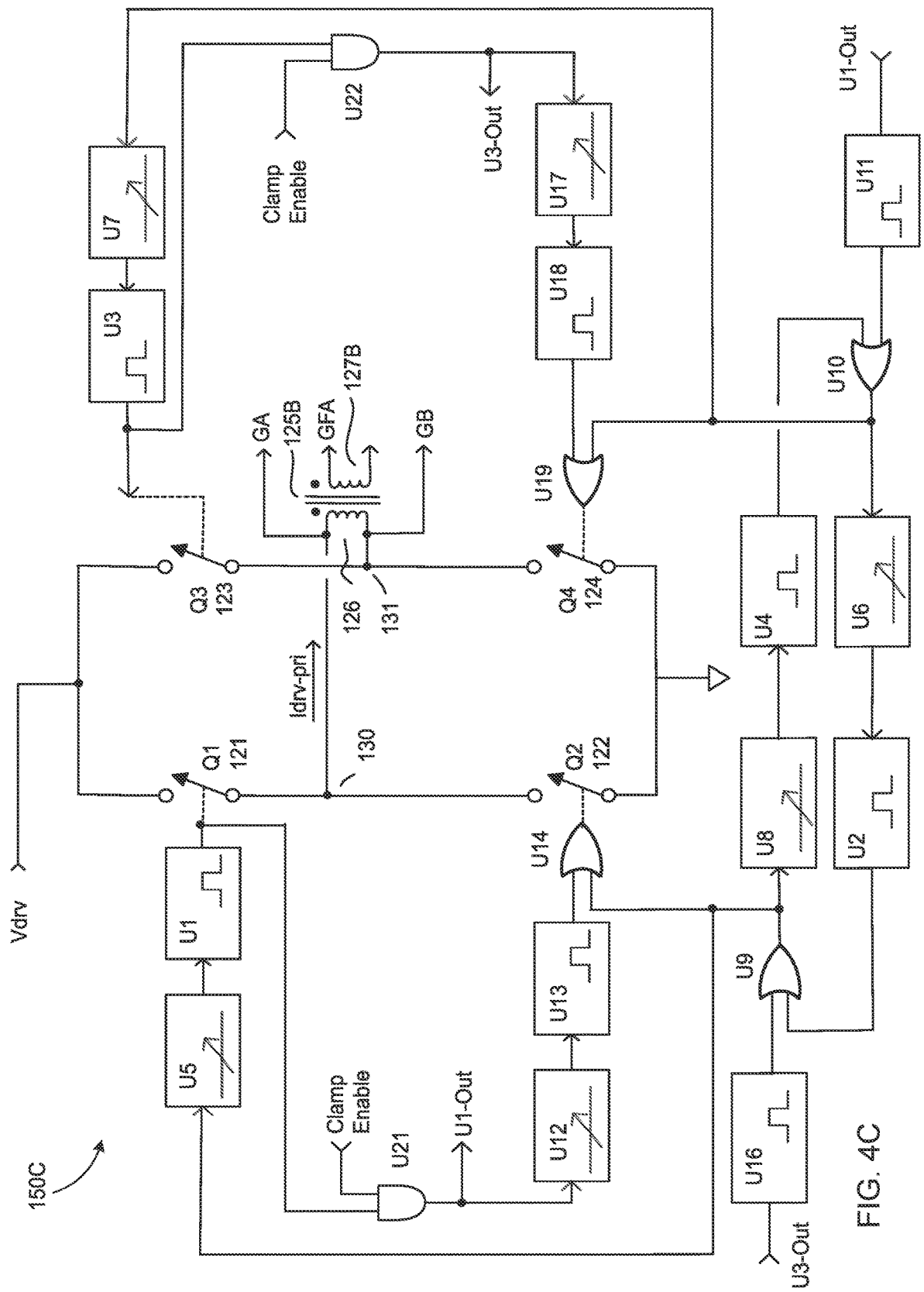

Referring to FIGS. 4C, gate drive circuit 150C includes pulse blocks U1, U2, U3, and U4, delay blocks U5, U6, U7, and U8, which function as described above in connection with FIG. 4B. In addition, the gate drive circuit 150C includes AND gates U21 and U22, pulse blocks U11, U13, U16, and U18, delay blocks U12 and U17, and OR gates U9, U10, U14, and U19 to generate timing control signals for implementing the clamp. In FIG. 4C, the clamp timing circuitry (AND gates U21 and U22, pulse blocks U11, U13, U16, and U18, delay blocks U12 and U17, and OR gates U9, U10, U14, and U19) allows driver 150C to operate Q2 and Q4 simultaneously during a driver clamp phase when enabled and subsequently return to the normal timing cycle (as described above in connection with FIGS. 5A and 5B) established by U1, U2, U3, U4, U5, U6, U7, and U8. With the Clamp Enable signal LOW (disabled), the U1-Out and U3-Out signals remain LOW, deactivating U11, U12, U13, U16, U17, and U18, allowing the signals from blocks U2 and U4 to respectively pass through OR gates U9 and U14 and U10 and U19 unchanged, and consequently allowing the gate drive circuit 150C to behave in the same manner as the circuit 150B (FIG. 4B) described above.

Operation of the gate drive circuit 150C with the Clamp Enable signal HIGH (activated) will be described in connection with the waveforms shown in FIG. 8, in which waveform 8A shows the output of U2, waveform 8B shows the output of U9, waveform 8C shows the output of U4, waveform 8D shows the output of U10, waveform 8E shows the output of U1, waveform 8F shows the output of U3, waveform 8G shows the output of U11, waveform 8H shows the output of U16, waveform 8I shows the output of U14, waveform 8J shows the output of U19, and waveforms 8K and 8L show the voltage at nodes 130 and 131.

Figure 8:
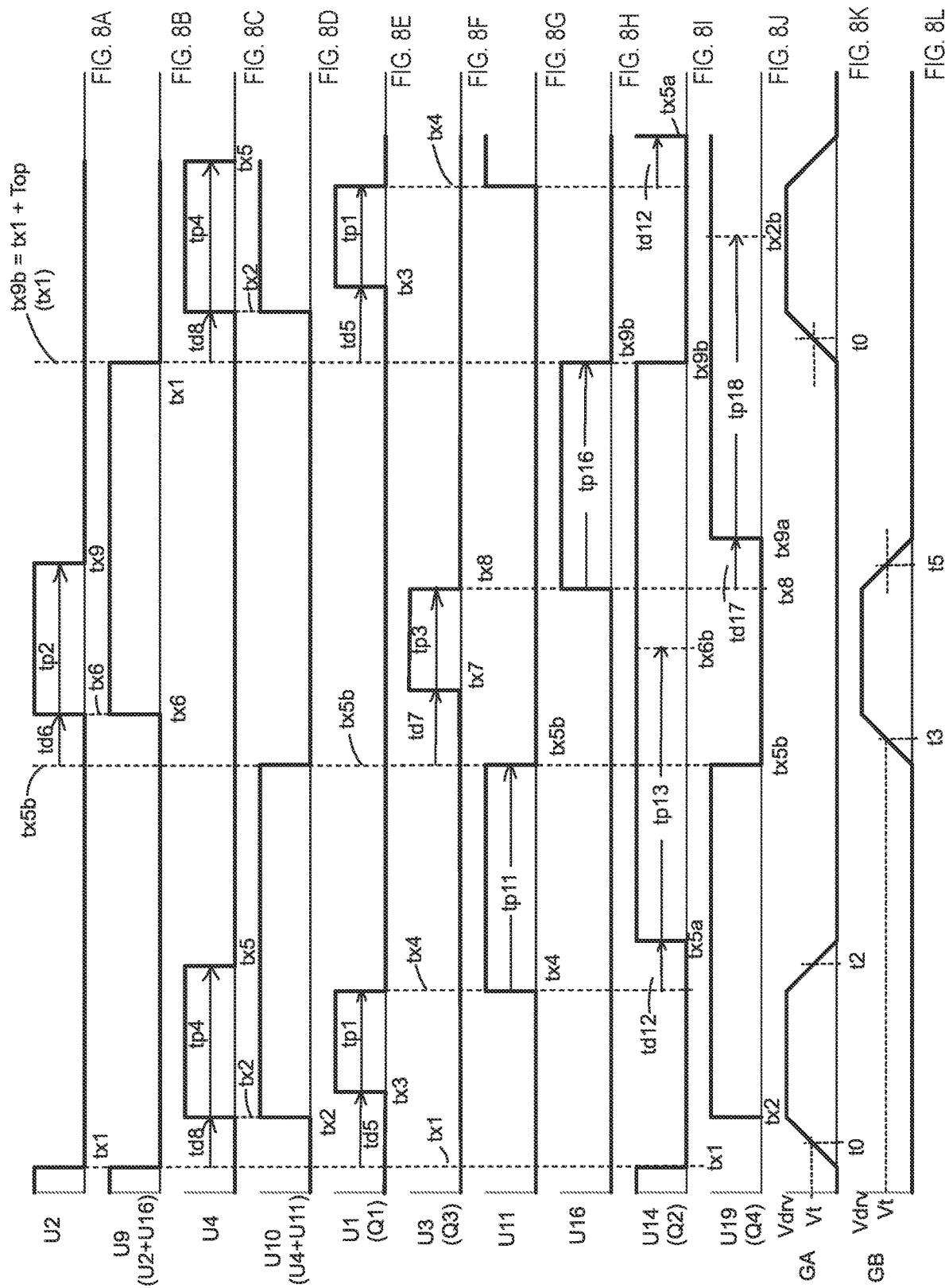
FIGS. 8A-8L show waveforms for a clamp cycle in the gate drive circuit.

The operating cycle in FIG. 8 is illustrated ending on a normal (not clamped) cycle and beginning at time tx1 operating in the same manner as described in connection with FIGS. 5 and 6 from time tx1 until time tx4. The following description assumes that the Clamp Enable signal (FIG. 4C) is HIGH (enabled) before time tx3, allowing the output of AND gate U21 to follow the output of pulse block U1, i.e. will go HIGH when U1 is triggered at time tx3. The output of pulse block U1 resets after the time, tp1, at time tx4 (tx4=tx3+tp1) turning gate drive switch Q1 OFF, allowing the current flowing in the primary winding 126 of the gate drive transformer 125 to discharge node 130, causing the voltage GA to decrease toward ground potential. The resetting output of pulse block U1 causes AND gate U21 to return to LOW, triggering pulse block U11 and delay block U12 at time tx4 and starting the clamp timing generator circuit in gate driver 150C.

Pulse block U11 outputs a HIGH signal when triggered at time tx4 keeping the output of OR gate U10 HIGH, which in turn keeps the output of OR gate U19 HIGH, which consequently keeps switch Q4 ON past the end of the U4 pulse, which is assumed to occur after time tx4 and before time tx5a. After the delay, td12, of delay block U12, i.e. at time tx5a (tx5a=tx4+td12), delay block U12 outputs a signal triggering pulse block U13 causing its output to go HIGH, driving the output of OR gate U14 HIGH to turn switch Q2 ON for the duration, tp13, of the U13 pulse. Under ideal conditions, the current flowing in the primary winding 126 of the gate drive transformer 125B will discharge node 130 completely to ground potential (GA=0) by the end of the delay td12 allowing for ZVS turn ON of gate drive switch Q2 at time tx5a. Delay td12 thus provides a ZVS transition of Q2 during the clamp cycle initiated by U1. With both gate drive switches Q2 and Q4 ON during the U11 pulse (from tx4 to tx5b), the primary winding 126 of the gate drive transformer will be clamped, storing energy in the gate drive transformer.

The duration, tp13, of pulse block U13 may preferably be set to a value greater than the sum of the duration, tp11, of pulse block U11 and delay, td6, of delay block U6 less the delay td12 of delay block U12 to ensure that the output of U13 remains HIGH past time tx6 to keep gate drive switch Q2 ON from time tx4 through time tx6. The duration, tp13, of pulse block U13 should also preferably be set to a value less than the sum of duration, tp11, of pulse block U11, delay, td6, of delay block U6, and duration, tp2, of pulse block U2 to avoid conflicts with the succeeding half cycle. The output of pulse block U13 resets to LOW after the time, tp13, at time tx6b (tx6b=tx5a+tp13), which being after time tx6, keeps the output of OR gate U14 HIGH, and thus gate drive switch Q2 ON until after U2 triggers taking control of switch Q2 until time tx9.

After the duration, tp11, of pulse block U11, i.e. at time tx5b (tx5b=tx4+tp11), the output of pulse block U11 resets to LOW. Assuming that the output of pulse block U4 has returned to LOW (pulse U4 has ended) before time tx5b (tx5 occurs before tx5b), the LOW signal at the output of U11 causes the output of OR gate U10 to return to LOW, triggering delay blocks U6 and U7 and turning OFF gate drive switch Q4, ending the clamp of the gate drive transformer and allowing the current flowing in the primary winding of the gate drive transformer to begin charging node 131 toward Vdrv. After the delay, td6, of delay block U6, i.e. at time tx6 (tx6=tx5b+td6), delay block U6 triggers pulse block U2 causing its output to be HIGH, causing the output of OR gate U9 to be HIGH, keeping the output of U14 HIGH, and the gate drive switch Q2 ON for the duration of the pulse tp6. After the delay, td7, of delay block U7 at time tx7 (tx7=tx5b+td7), delay block U7 outputs a signal triggering pulse block U3 which outputs a HIGH signal turning gate-drive switch Q3 ON. Under ideal conditions, node 131 will be charged to the potential of Vdrv (GB=Vdrv), allowing gate-drive switch Q3 to be turned ON with zero voltage across it for full ZVS operation at time tx7.

The following description assumes that the Clamp Enable signal (FIG. 4C) is HIGH (enabled) before time tx7, allowing the output of AND gate U22 to follow the output of pulse block U3, i.e. will go HIGH when U3 is triggered at time tx7. The output of pulse block U3 resets after the time, tp3, at time tx8 (tx8=tx7+tp3) turning gate drive switch Q3 OFF, allowing the current flowing in the primary winding 126 of the gate drive transformer 125 to discharge node 131, causing the voltage GB to decrease toward ground potential. The resetting output of pulse block U3, causes AND gate U22 to return to LOW, triggering pulse block U16 and delay block U17 at time tx8 and starting the clamp timing generator circuit in gate driver 150C for another gate clamp cycle.

Pulse block U16 outputs a HIGH signal when triggered at time tx8 which keeps the output of OR gate U9 HIGH, which in turn keeps the output of OR gate U14 HIGH, which consequently keeps switch Q2 ON past the end of the U2 pulse at time tx9, which is assumed to occur after time tx8 and before time tx9a. After the delay, td17, of delay block U17, i.e. at time tx9a (tx9a=tx8+td17), delay block U17 outputs a signal triggering pulse block U18 causing the output to go HIGH, driving the output of OR gate U19 HIGH to turn switch Q4 ON for the duration, tp18, of the U18 pulse. Under ideal conditions, the current flowing in the primary winding 126 of the gate drive transformer 125B will discharge node 131 completely to ground potential (GB=0) by the end of the delay td17 allowing for ZVS turn ON of gate drive switch Q4 at time tx9a. Delay td17 thus provides a ZVS transition of Q4 during the clamp cycle initiated by U3. With both gate drive switches Q2 and Q4 ON during the U16 pulse (from tx8 to tx9b), the primary winding 126 of the gate drive transformer will be clamped, storing energy in the gate drive transformer.

The duration, tp18, of pulse block U18 may be preferably greater than the sum of the duration, tp16, of pulse block U16 and delay, td8, of delay block U8 less delay td17 of delay block U17 to ensure that the output of U18 remains HIGH past time tx2 of the next operating cycle to keep gate drive switch Q4 ON from time tx8 through time tx2. The duration, tp18, of pulse block U18 should however be less than the sum of duration, tp16, of pulse block U16, delay, td8, of delay block U8, and duration, tp4, of pulse block U4 to avoid conflicts with the subsequent half cycle. The output of pulse block U18 resets to LOW after the time, tp18, at time tx2b (tx2b=tx9a+tp18), which keeps the output of OR gate U19 HIGH, and thus gate drive switch Q4 ON at least until after tx2b.

After the duration, tp16, of pulse block U16, i.e. at time tx9b (tx9b=tx8+tp16), the output of pulse block U16 resets to LOW. Assuming that the output of pulse block U2 has returned to LOW (pulse U2 has ended at time tx9) before time tx9b, the LOW signal at the output of U16 causes the output of OR gate U9 to return to LOW, triggering delay blocks U8 and U5 and turning OFF gate drive switch Q2, ending the clamp of the gate drive transformer and allowing the current flowing in the primary winding of the gate drive transformer to begin charging node 130 toward Vdrv. After the delay, td8, of delay block U8, i.e. at time tx2 (tx2=tx9b+td8), delay block U8 triggers pulse block U4 causing its output to be HIGH, causing the output of OR gate U10 to be HIGH, keeping the output of U19 HIGH and the gate drive switch Q4 ON. After the delay, td5, of delay block U5 at time tx3 (tx3=tx9b+td5), delay block U5 outputs a signal triggering pulse block U1 which outputs a HIGH signal turning gate-drive switch Q1 ON. Under ideal conditions, node 130 will be charged to the potential of Vdrv (GA=Vdrv), allowing gate-drive switch Q1 to be turned ON with zero voltage across it for full ZVS operation at time tx3. The operating cycle of the gate driver continues in the manner described above until the Clamp Enable signal is set to LOW (disabled) and the driver is allowed to return to normal (unclamped) operation as described above in connection with FIGS. 5 and 6.

The duration of the clamp of the gate drive transformer may be set by duration tp11 less delay td12 and duration tp14 less delay t17. The delays td12 and td17 of delay blocks U12 and U17 establish time for the voltage at respective nodes 130 and 131 to transition toward ground potential before turning ON the respective gate drive switches Q2 and Q4 for ZVS operation. Note that FIG. 8 is intended to show generalized approximations of actual behavior and as such is not intended to reflect, nor should the approximations be interpreted to represent, unnecessary detail. For example, the duration of the ZVS and clamp intervals may be exaggerated in FIG. 8 for the purpose of illustrating the operation of the driver.

Figure 7:
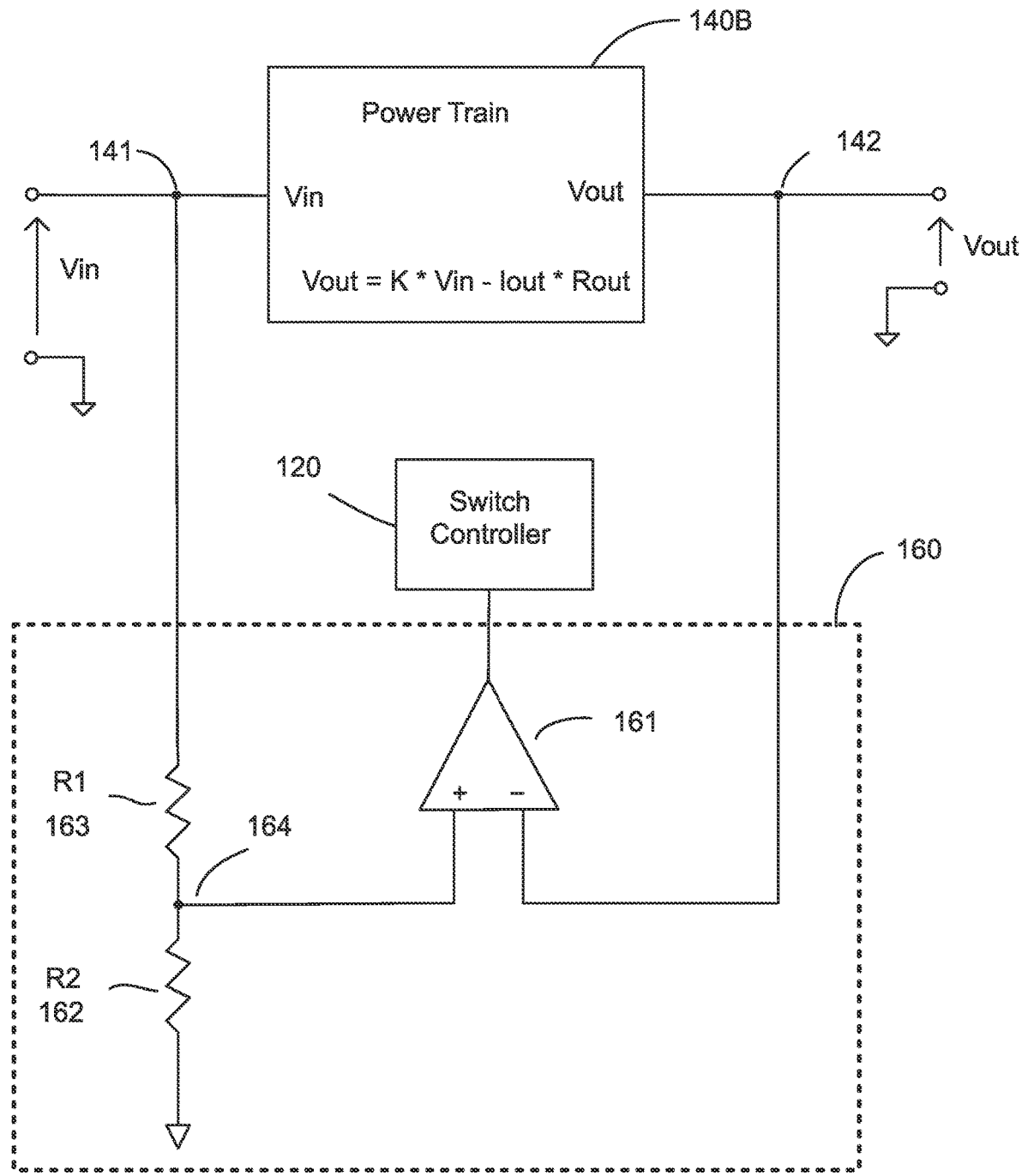
FIG. 7 shows a block diagram of a current monitoring circuit.

The ASAC controller 120 may monitor the output current of the power train 140B and adjust the PTI and EM durations and the converter operating frequency using the ASAC timing architecture described above and preferably using the gate-drive circuit shown in FIGS. 4A and 4B to maximize efficiency of the converter under various operating conditions. Referring to FIG. 7, the ASAC power train may be controlled as a function of load current by current monitoring circuit 160 having a first input connected to the input voltage (node 141) and a second input connected to sense the output voltage (node 142) of the non-isolated power train 140B (FIG. 1B). The example shown assumes a fixed ratio converter, such as an ASAC, having an essentially constant voltage gain K=Vout/Vin at a load current, where Vin is the input source voltage and Vout is the rectified output voltage across the load and an essentially constant output resistance, Rout, above a load current (e.g., IL2 in FIG. 3A). A voltage divider network including R1 163 and R2 162 provide scaling for the input voltage (assuming Vin >Vout) that matches the conversion ratio K=Vout/Vin. Difference amplifier 161 amplifies the difference between the scaled input voltage (K*Vin) and the output voltage, Vout, and provides an output to the switch controller 120 which may then adjust operation of the ASAC as described above. In this way, the current monitor circuit 160 produces an output signal that represents the power-train output current without incurring losses in a sense resistance. The controller may additionally monitor the temperature of the converter and adjust for any temperature dependencies in the output resistance of the converter to improve the accuracy of the current monitor 160.

A number of embodiments of the invention have been described. Nevertheless, it will be understood that various modifications may be made without departing from the spirit and scope of the invention. For example, although a half-bridge primary configuration is shown in FIGS. 1A and 1B, any of the alternate SAC configurations may be used to implement the ASAC topology. In non-isolated applications, the power train 140B of FIG. 1B may preferably use one of the optimized series-connected topologies described in Vinciarelli, et al., Power Distribution Architecture With Series-Connected Bus Converter, U.S. patent application Ser. No. 13/933,252 filed Jul. 29, 2013. Optionally, the clamped capacitor circuitry and control techniques described in the CSAC patent may be implemented in an ASAC for operation at higher loads to incorporate optional clamp intervals to extend the ON time of the switches beyond $T_{PTI-Full}$, shown in FIG. 2A and FIG. 5, i.e. longer than one half of the characteristic resonant period, for operation with increased efficiency at even higher loads. For example transfer function as shown in FIG. 3B for load currents greater than a lower threshold, $I_{L3}$, and less than an upper threshold, $I_{L4}$, $I_{L4}>I_{LOAD}>I_{L3}$, the controller may add clamp intervals to extend the PTI duration from the half-resonant period, $T_{PTI-Full}$ up to a maximum duration, $T_{PTI-max}$. Although the threshold $I_{L3}$ is shown greater than $I_{L2}$ in FIG. 3, it may be set equal to $I_{L2}$. Furthermore the slope of the lines, $I_{LOAD}>I_{L3}$ and $I_{LOAD}<I_{L2}$, may be nearly the same or different. As a further example, the combination of pulse blocks, delay blocks, and logic gates shown in FIGS. 4A, 4B, and 4C may be replaced by a different combination of pulse blocks and delay blocks, or by equivalent functions implemented using analog or digital control techniques.

Figure 9:
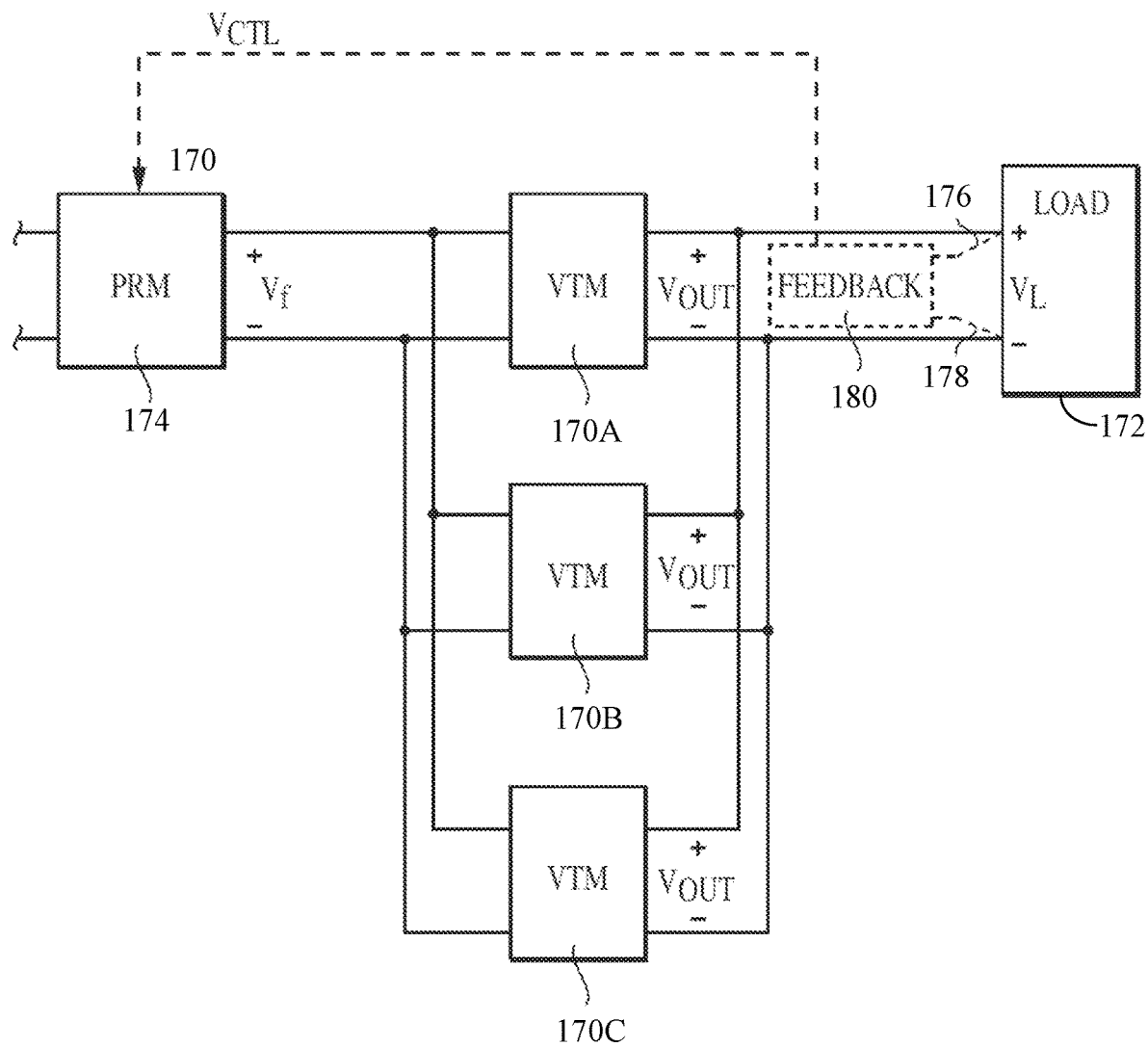
FIG. 9 is a block diagram of a power-sharing array of VTMs with optional remote feedback to a power regulator or PRM from a point-of-load feedback controller.

In certain applications, the power requirements of a load may exceed the power capability of a single VTM and an array of VTMs may need to be paralleled to support the load. Furthermore, in applications that call for fault tolerant back up of point-of-load converters, arrays of paralleled converters may be used to share the load among the converters. An example of a power sharing array of VTMs 170A, 170B, 170C having their inputs and outputs connected in parallel to feed a load 172 is shown in FIG. 9. As discussed above, current sharing among paralleled VTMs is a function of the relative output resistance, Rout, of each VTM. As also described above, current sharing accuracy may be greater with SACs than with non-resonant VTMs. Accuracy of point-of-load voltage may be increased using a feedback architecture. A power regulator module (PRM) 174 is shown in FIG. 9 supplying a controlled voltage $V_f$ to the VTMs. The voltage at the point-of-load may be actively regulated using the architecture shown in FIG. 18, 19, or 20 of the SAC Patents. In FIG. 9, sensing leads 176, 178 deliver the voltage $V_L$ at the point-of-load to a feedback controller 180 (similar to FIG. 20 of the SAC Patents). The feedback controller (which may be locally powered by the voltage $V_L$) monitors the value of $V_L$, compares it with an internal reference signal $V_{ref}$, and generates a control signal, Vat, delivered to the control input of the PRM 174 (or a remote power regulator, e.g. 38 in FIG. 3A, or a remote PRM, e.g. 43 in FIG. 3B of the SAC Patents). The presence of such a feedback loop complements the simple, scalable power-sharing attributes of an array of paralleled VTMs with high bandwidth, high DC gain point-of-load regulation and without the active circuitry and wiring complexities and attendant single point system failure mechanisms, stability issues, limited performance and high cost, or any of many other potential downfalls and limitations, of arrays of DC-DC converters.

Figure 10:
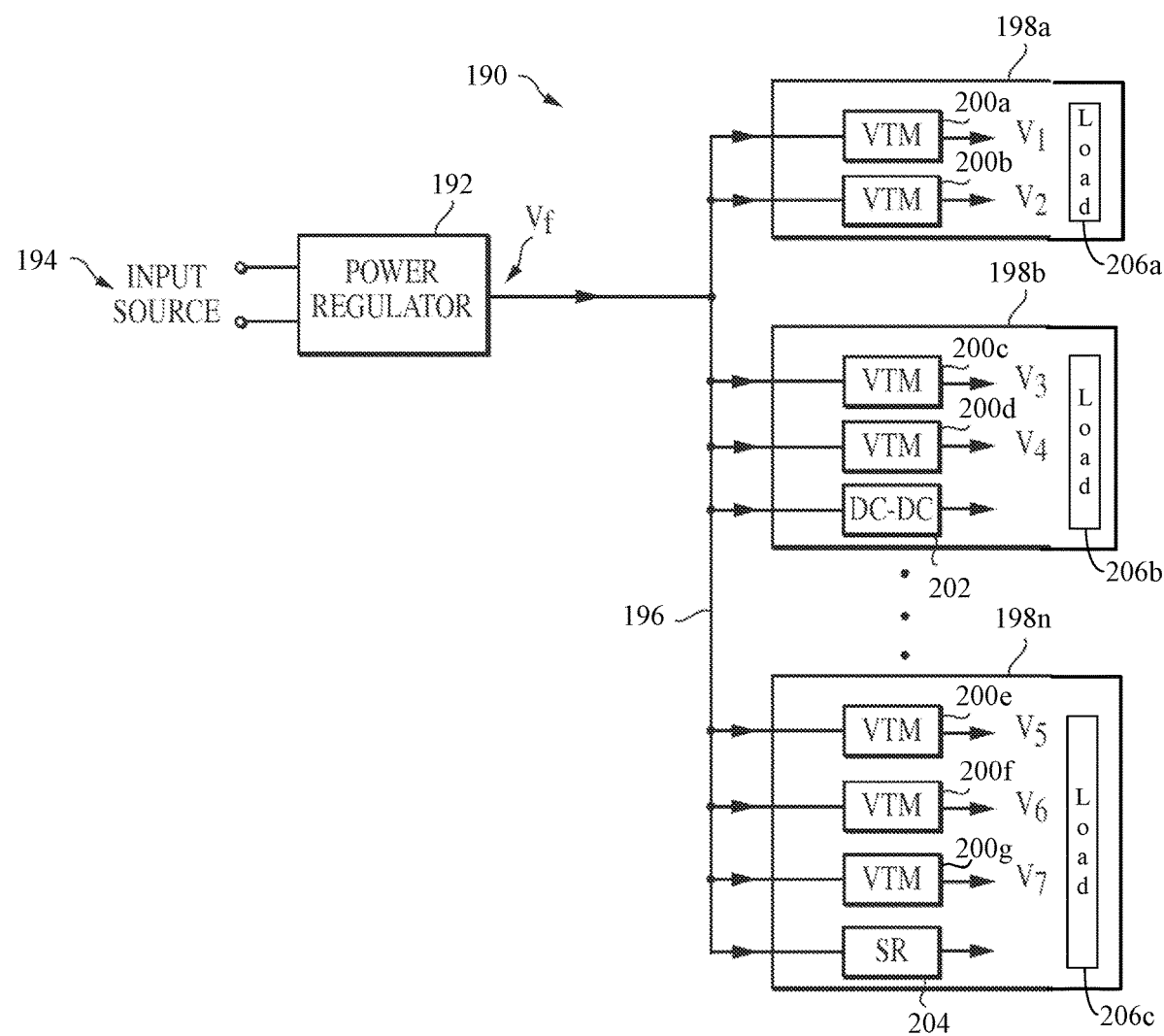
FIG. 10 shows a block diagram of an example of the factorized power architecture described in the SAC Patents.

In FIG. 10 the system 190 is an expanded version of the system 36 of FIG. 3 of the SAC Patents. A front-end power regulator 192 accepts power from an input source 194 and converts it into a controlled bus voltage, $V_f$, at its output which is distributed over a distance via a factorized distribution bus 196 to a number of separate electronic circuit subassembly PCBs 198a through 198n, each of which incorporates one or more VTMs, e.g., VTMs 200a through 200g. The VTMs provide load voltages (e.g., voltages $V_1$ to $V_7$) that power loads 206a, 206b, 206c on the subassembly PCBs. In addition to VTMs, the subassembly PCBs may contain DC-DC converters (e.g., DC-DC converter 202) and/or Switching Regulators (e.g., Switching Regulator 204) and/or Charge Pumps (not shown) to provide certain output voltages.

Accordingly, other embodiments are within the scope of the following claims.

What is claimed is:

1. A method comprising:
   providing a first switching power converter configured and arranged to convert DC power received from a converter input for delivery to a converter output at an essentially fixed voltage transformation ratio, K=Vout/Vin, K≠1, the first switching power converter having an output resistance;

providing circuitry having a first input connected to the converter input for sensing an input voltage, a second input connected to the converter output for sensing an output voltage, and circuitry adapted to provide a signal proportional to a difference between the output voltage and a scaled replica of the input voltage, wherein the scaled replica of the input voltage is different from the input voltage; and using the signal to sense a current delivered by the first switching power converters;

wherein providing circuitry comprises providing the circuitry adapted to provide the signal proportional to the difference between the output voltage and the scaled replica of the input voltage, wherein the scaled replica of the input voltage scales the input voltage in proportion with the transformation ratio K=Vout/Vin.

2. The method of claim 1 wherein the first switching power converter further comprises:
a transformer having a primary winding and a secondary winding;
primary switching elements electrically coupled to the primary winding; and
secondary switching elements electrically coupled to the secondary winding;
wherein the method further comprises adjusting a duration during which the primary or secondary switching elements, or both, are ON based on the signal.

3. The method of claim 2 wherein the first switching power converter comprises a voltage transformation module that comprises the transformer, the primary switching elements, and the secondary switching elements;
wherein the voltage transformation module uses balanced switching duty cycles in which each primary switching element of a complementary pair is on for essentially the same amount of time as its complement and each secondary switching element of a complementary pair is ON for essentially the same amount of time as its complement.

4. The method of claim 1 wherein the first switching power converter further comprises: an inductive component and one or more power switches in an input circuit or an output circuit or both; and
wherein a current flowing in the inductive component charges and discharges capacitances in the first switching power converter reducing a voltage across said one or more switches prior to turn ON said one or more switches.

5. The method of claim 1, comprising:
providing a plurality of switching power converters having respective inputs or outputs or both connected in parallel, wherein the plurality of switching power converters include the first switching power converter;
providing the circuitry to sense the respective current delivered by each of the switching power converters; and
adjusting in one or more of the plurality of switching power converters a duration during which respective primary or secondary switching elements, or both, are ON based on the respective signal.

6. The method of claim 5 wherein the outputs of the plurality of switching power converters are connected in parallel to support a common load.

7. The method of claim 5, further comprising providing a load current from each of multiple voltage transformation modules to a different respective load.

8. The method of claim 1, comprising providing a load current to a microprocessor.

9. The method of claim 1 wherein K<1.

10. The method of claim 1 wherein the first switching power converter comprises a plurality of power switches and an inductance and is configured to use a current flowing in the inductance to charge and discharge capacitances in the first switching power converter and reduce a voltage across one or more of the plurality of power switches prior to turn ON or turn OFF of the one or more of the plurality of power switches.

11. The method of claim 1 wherein the first switching power converter comprises a plurality of power switches and an inductance and is configured to use a current flowing in the inductance to charge and discharge capacitances in the first switching power converter and reduce a current through one or more of the power switches prior to turn ON or turn OFF of the one or more of the power switches.

12. The method of claim 1, further comprising using the first switching power converter to convert power from the converter input to the converter output via a transformer.

13. The method of claim 1, further comprising sensing a temperature of the first switching power converter and adjusting the signal to compensate for variations in the output resistance as a function of the temperature.

14. An apparatus comprising:
a switching power converter configured and arranged to convert DC power received from a converter input at an input voltage, Vin, for delivery to a converter output at an output voltage, Vout, at an essentially fixed voltage transformation ratio, K 32 Vout/Vin, K≠1, the switching power converter having an output resistance; and
a current sensing circuit having a first input connected to the converter input for sensing the input voltage, a second input connected to the converter output for sensing the output voltage and being constructed and arranged to provide a signal proportional to (a) a difference between the output voltage and a scaled replica of the input voltage, or (b) a difference between the input voltage and a scaled replica of the output voltage, or (c) a difference between a scaled replica of the input voltage and a scaled replica of the output voltage, wherein the scaled replica of the input voltage is different from the input voltage, the scaled replica of the output voltage is different from the output voltage;
wherein the signal is representative of a current delivered by the switching power converter; and
wherein the current sensing circuit further comprises a voltage divider network that provides the scaling in proportion with the transformation ratio K=Vout/Vin.

15. The system of claim 14, further comprising circuitry configured to sense a temperature of the switching power converter and adjust the signal to compensate for variations in the output resistance of the switching power converter as a function of the temperature.

16. The system of claim 14, further comprising a switch controller configured to actively adapt durations of power transfer intervals based on the current delivered by the switching power converter.

17. The system of claim 16 wherein the switching power converter comprises a transformer, a resonant circuit including the transformer having a characteristic resonant frequency and a characteristic resonant period, and primary switches connected to drive the resonant circuit; and the switch controller is configured to operate the primary switches in a series of converter operating cycles and actively adapt durations of the power transfer intervals based on the current delivered by the switching power converter to provide the essentially fixed voltage transformation ratio, $K=V_{OUT}/V_{IN}$ at the current delivered by the switching power converter.

18. A system comprising:
a first switching power converter configured and arranged to convert DC power received from a converter input at an input voltage, Vin, for delivery to a converter output at an output voltage, Vout, using an essentially fixed voltage transformation ratio, K=Vout/Vin, K≠1, in a series of converter operating cycles during which power switches in the first switching power converter are turned ON and OFF, the first switching power converter having an effective series resistance; and
current sensing circuitry having a first input connected to the converter input, a second input connected to the converter output, scaling circuitry connected to the first input, the second input, or both, the scaling circuitry providing a scaled replica of the voltage at its respective input, the scaled replica of the voltage at its respective input being different from the voltage at its respective input, the current sensing circuitry being configured and arranged to provide a signal proportional to a difference in voltage between the first input and the second input;
wherein the signal is representative of a current delivered by the first switching power converter; and
wherein the scaling circuitry comprises a voltage divider network that provides the scaling in proportion with the transformation ratio K=Vout/Vin.

19. The system of claim 18 wherein the first switching power converter further comprises:
a transformer having a primary winding and a secondary winding;
primary switching elements electrically coupled to the primary winding;
secondary switching elements electrically coupled to the secondary winding; and
a switching controller configured to adjust a duration during which the primary or secondary switching elements, or both, are ON based on the signal.

20. The system of claim 18 wherein the first switching power converter further comprises: an inductive component; and
wherein the first switching power converter is configured such that a current flowing in the inductive component charges and discharges capacitances in the first switching power converter reducing a voltage across said one or more power switches prior to turn ON said one or more power switches.

21. The system of claim 18, comprising:
a plurality of switching power converters having respective converter inputs or converter outputs or both connected in parallel, wherein the plurality of switching power converters include the first switching power converter;
wherein the current sensing circuitry is configured and arranged to sense the respective current delivered by each of the switching power converters; and
further comprising a switching controller configured to adjust in one or more of the plurality of switching power converters a duration during which respective primary or secondary switching elements, or both, are ON based on the respective signal.

22. The system of claim 21 wherein the outputs of the plurality of switching power converters are connected in parallel to support a common load.

23. A method comprising:
using one or more power switches of a first power converter operated in a series of converter operating cycles to convert DC power received from a converter input of the first power converter at an input voltage, Vin, for delivery to a converter output of the first power converter at an output voltage, Vout, and output current, Tout, at an essentially fixed voltage transformation ratio, K=Vout/Vin, at a load current, the first power converter having an output resistance;
detecting a first voltage at a first input coupled to the converter input;
detecting a second voltage at a second input coupled to the converter output;
performing a scaling function to adjust at least one of the input voltage or the output voltage by a predetermined ratio, R, to produce a scaled value;
determining a difference value between the input voltage and the scaled value or the output voltage and the scaled value, by comparing the input voltage and the scaled value or comparing the output voltage and the scaled value; and
using the difference value to determine the output current, Tout, of the first power converter;
wherein performing the scaling function comprises providing a signal proportional to (a) a difference between the output voltage and a scaled replica of the input voltage, or (b) a difference between the input voltage and a scaled replica of the output voltage, and
wherein at least one of (i) the scaled replica of the input voltage comprises the input voltage scaled in proportion with the transformation ratio K=Vout/Vin, or (ii) the scaled replica of the output voltage comprises the output voltage scaled in proportion with the transformation ratio K=Vout/Vin.

24. The method of claim 23 wherein the first power converter further comprises:
a transformer having a primary winding and a secondary winding,
primary switching elements electrically coupled to the primary winding, and
secondary switching elements electrically coupled to the secondary winding,
wherein the method further comprises adjusting a duration during which the primary or secondary switching elements, or both, are ON based on the signal.

25. The method of claim 24 wherein the first power converter comprises a voltage transformation module that comprises the transformer, the primary switching elements, and the secondary switching elements;
wherein the voltage transformation module uses balanced switching duty cycles in which each primary switching element of a complementary pair is on for essentially the same amount of time as its complement and each secondary switching element of a complementary pair is ON for essentially the same amount of time as its complement.

26. The method of claim 23 wherein performing the scaling function comprises using a scaling circuitry to provide a scaling in proportion with the transformation ratio K=Vout/Vin.

27. The method of claim 26 wherein the scaling circuitry comprises a voltage divider network that provides the scaling in proportion with the transformation ratio K=Vout/Vin.

28. The method of claim 23 wherein the first power converter further comprises an inductive component;
wherein the one or more power switches are disposed in an input circuit or an output circuit or both; and
wherein a current flowing in the inductive component charges and discharges capacitances in the first power converter reducing a voltage across the one or more switches prior to turn ON the one or more switches.

29. The method of claim 23, comprising:
providing a plurality of power converters having respective inputs or outputs or both connected in parallel, wherein the plurality of power converters include the first power converter;
sensing the respective current delivered by each of the power converters; and
adjusting in one or more of the plurality of power converters a duration during which respective primary or secondary switching elements, or both, are ON based on the respective signal.

30. The method of claim 29 wherein the outputs of the plurality of power converters are connected in parallel to support a common load.

31. The method of claim 29, further comprising providing a load current from each of multiple voltage transformation modules to a different respective load.

32. The method of claim 23, comprising providing a load current to a microprocessor.

33. The method of claim 23 wherein K<1.

34. The method of claim 23 wherein the first power converter comprises an inductance and is configured to use a current flowing in the inductance to charge and discharge capacitances in the first power converter and reduce a voltage across one or more of the one or more power switches prior to turn ON or turn OFF of the one or more of the one or more power switches.

35. The method of claim 23 wherein the first power converter comprises an inductance and is configured to use a current flowing in the inductance to charge and discharge capacitances in the first power converter and reduce a current through one or more of the one or more power switches prior to turn ON or turn OFF of the one or more of the one or more power switches.

36. The method of claim 23, further comprising using the first power converter to convert power from the converter input to the converter output via a transformer.

37. The method of claim 23, further comprising sensing a temperature of the first power converter and adjusting the signal to compensate for variations in the output resistance as a function of the temperature.

38. The method of claim 23, further comprising actively adapting durations of power transfer intervals based on the output current delivered by the first power converter.

39. The method of claim 38 wherein the first power converter comprises a transformer, a resonant circuit including the transformer having a characteristic resonant frequency and a characteristic resonant period, and primary switches connected to drive the resonant circuit; and
wherein the method comprises operating the primary switches in a series of converter operating cycles and actively adapt durations of the power transfer intervals based on the current delivered by the first power converter to provide the essentially fixed voltage transformation ratio, $K=V_{OUT}/V_{IN}$ at the current delivered by the first power converter.

* * * * *

UNITED STATES PATENT AND TRADEMARK OFFICE
CERTIFICATE OF CORRECTION

PATENT NO. : 11,831,246 B1
APPLICATION NO. : 17/236162
DATED : November 28, 2023
INVENTOR(S) : Patrizio Vinciarelli It is certified that error appears in the above-identified patent and that said Letters Patent is hereby corrected as shown below:

In the Specification

In Column 1, Line 23, delete "converters," and insert -- converters. --.

In Column 8, Line 37, delete "$I_L < I_{Load}$" and insert -- $I_{L1} < I_{Load}$ --.

In Column 9, Line 8, delete "$I_p(t)$" and insert -- $I_P(t)$ --.

In Column 9, Line 51, delete "$I_p(t_0)$" and insert -- $I_P(t_0)$ --.

In Column 9, Line 55, delete "$I_P(t_0)=+I_{m\text{-}pk}=+I_{m\text{-}pka}$" and insert -- $I_P(t_0)=+I_{M\text{-}pk}=+I_{M\text{-}pka}$ --.

In Column 9, Line 60, delete "at time to" and insert -- at time $t_0$ --.

In Column 13, Line 5, delete "FIG." and insert -- FIGS. --.

In Column 13, Line 10, delete "FIG." and insert -- FIGS. --.

In Column 14, Line 1, delete "EM" and insert -- ERI --.

In Column 14, Line 21, delete "EM" and insert -- ERI --.

In Column 15, Line 17, delete "EM" and insert -- ERI --.

In Column 15, Line 28, delete "EM" and insert -- ERI --.

In Column 15, Line 59, delete "EM-B" and insert -- ERI-B --.

In Column 16, Line 23, delete "FIGS." and insert -- FIG. --.

Signed and Sealed this
Twenty-sixth Day of March, 2024

*Katherine Kelly Vidal*
Katherine Kelly Vidal
*Director of the United States Patent and Trademark Office*

CERTIFICATE OF CORRECTION (continued)
U.S. Pat. No. 11,831,246 B1

In Column 19, Line 18, delete "EM" and insert -- ERI --.

In Column 20, Line 4, delete "$_{TPTI-max.}$" and insert -- $T_{PTI-max.}$ --.

In Column 20, Line 28, delete "$V_f$to" and insert -- $V_f$ to --.

In Column 20, Line 30, delete "FIG." and insert -- FIGS. --.

In Column 20, Line 36, delete "Vat" and insert -- $V_{ctl}$ --.

In the Claims

In Column 21, Line 15, Claim 1, delete "converters" and insert -- converter --.

In Column 22, Line 34, Claim 14, delete "K 32" and insert -- K= --.

In Column 22, Line 54, Claim 15, delete "The system" and insert -- The apparatus --.

In Column 22, Line 59, Claim 16, delete "The system" and insert -- The apparatus --.

In Column 22, Line 63, Claim 17, delete "The system" and insert -- The apparatus --.

In Column 24, Line 11, Claim 23, delete "Tout" and insert -- Iout --.

In Column 24, Line 27, Claim 23, delete "Tout" and insert -- Iout --.